US012677283B2

(12) United States Patent
Park et al.

(10) Patent No.:  US 12,677,283 B2
(45) Date of Patent:       Jul. 7, 2026

(54) METHOD AND APPARATUS FOR TRANSMITTING AND RECEIVING CONTROL INFORMATION BASED ON CELL SWITCHING IN WIRELESS COMMUNICATION SYSTEM

(71) Applicant: Samsung Electronics Co., Ltd., Gyeonggi-do (KR)

(72) Inventors: Sungjin Park, Gyeonggi-do (KR); Youngbum Kim, Gyeonggi-do (KR); Hyunseok Ryu, Gyeonggi-do (KR); Seunghoon Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 639 days.

(21) Appl. No.: 17/979,288

(22) Filed: Nov. 2, 2022

(65) Prior Publication Data

US 2023/0140147 A1      May 4, 2023

(30) Foreign Application Priority Data

Nov. 3, 2021     (KR) ......................... 10-2021-0149991

(51) Int. Cl.
H04W 72/21        (2023.01)
H04W 72/23        (2023.01)
(52) U.S. Cl.
CPC ........... H04W 72/21 (2023.01); H04W 72/23 (2023.01)
(58) Field of Classification Search
CPC .................................................... H04W 72/21
See application file for complete search history.

(56) References Cited

U.S. PATENT DOCUMENTS

| | | | |
|---|---|---|---|
| 2019/0074935 A1* | 3/2019 | Babaei | ................. H04L 1/1854 |
| 2020/0359446 A1 | 11/2020 | Dinan | |
| 2021/0314096 A1 | 10/2021 | Lee et al. | |
| 2022/0240244 A1* | 7/2022 | Hugl | ................ H04W 72/0446 |
| 2022/0295392 A1* | 9/2022 | Papasakellariou | .... H04L 1/1861 |
| 2022/0304020 A1 | 9/2022 | Park et al. | |

(Continued)

FOREIGN PATENT DOCUMENTS

KR        10-2022-0131722        9/2022

OTHER PUBLICATIONS

Ericsson, 3GPP TSG-RAN WG1 Meeting #106bis-e R1-2108829 e-Meeting, Oct. 11-19, 2021 "HARQ-ACK Enhancements for IIoT/URLLC", pp. 36.

(Continued)

*Primary Examiner* — Jason E Mattis
(74) *Attorney, Agent, or Firm* — The Farrell Law Firm, P.C.

(57)         ABSTRACT

The disclosure relates to a 5G or 6G communication system for supporting a higher data transmission rate. A method performed by a terminal in a wireless communication system is provided. The method includes transmitting, to a base station, capability information of the terminal; receiving, from the base station, configuration information related to physical uplink control channel (PUCCH) cell switching according to the capability information; and transmitting, to the base station, a PUCCH on one of a plurality of serving cells for the PUCCH cell switching based on the configuration information. The plurality of serving cells for the PUCCH cell switching are in a same timing advance group (TAG).

20 Claims, 22 Drawing Sheets

(56)        References Cited

U.S. PATENT DOCUMENTS

| | | | |
|---|---|---|---|
| 2023/0051867 A1* | 2/2023 | Lin ........................ | H04L 5/001 |
| 2024/0291594 A1* | 8/2024 | Zhang .................. | H04L 5/0096 |
| 2024/0365356 A1* | 10/2024 | Liu ...................... | H04L 5/0023 |
| 2024/0414716 A1* | 12/2024 | Lin ...................... | H04L 1/1671 |

OTHER PUBLICATIONS

Nokia, Nokia Shanghai Bell, "HARQ-ACK Feedback Enhancements for URLLC/IIoT", R1-2109159, 3GPP TSG RAN WG1 #106-bis-e, Oct. 11-19, 2021, 27 pages.
NEC, "UE Feedback Enhancements for HARQ-ACK", R1-2109131, 3GPP TSG RAN WG1 #106bis-e, Oct. 11-19, 2021, 11 pages.
International Search Report dated Feb. 10, 2023 issued in counterpart application No. PCT/KR2022/016904, 8 pages.

\* cited by examiner

Radio frame (114)

Slot (106)

$N_{BW}^{DL}$ subcarriers (104)

$N_{RB}$ subcarriers (110)

Resource element (112)

Resource block (108)

$N_{symb}$ OFDM symbols (102)

FIG. 8
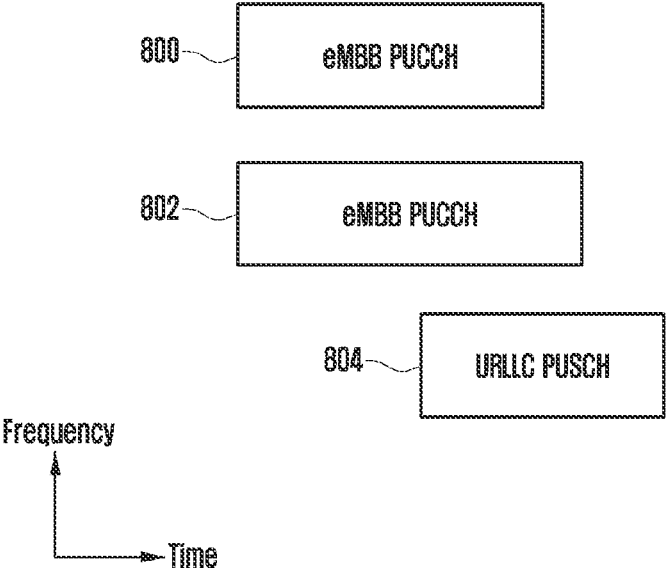
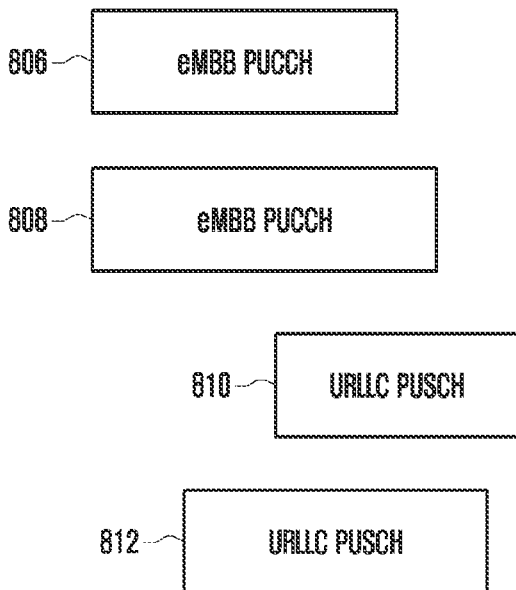

Receive PUSCH/PUCCH scheduling information having different priorities ~ 900

When PUSCHs having different priorities overlap in view of time resources, cancel transmission of PUSCH having lower priority and transmit UCI that has been piggybacked in that PUSCH, via separate PUCCH ~ 902

A UE receives configuration information on a plurality of carriers (or cells) from a base station ~1700

The UE identifies PUCCH resource information via higher signal or L1 signal ~1702

The UE determines whether PUCCH resources overlap for the plurality of carriers, and upon if the PUCCH resources overlap, transmits final PUCCH after performing multiplexing (or drop) ~1704

FIG. 19

PUCCH slot

Period

Period

Cell A
1900

Cell B

TA
difference

Cell A
1920

Cell B

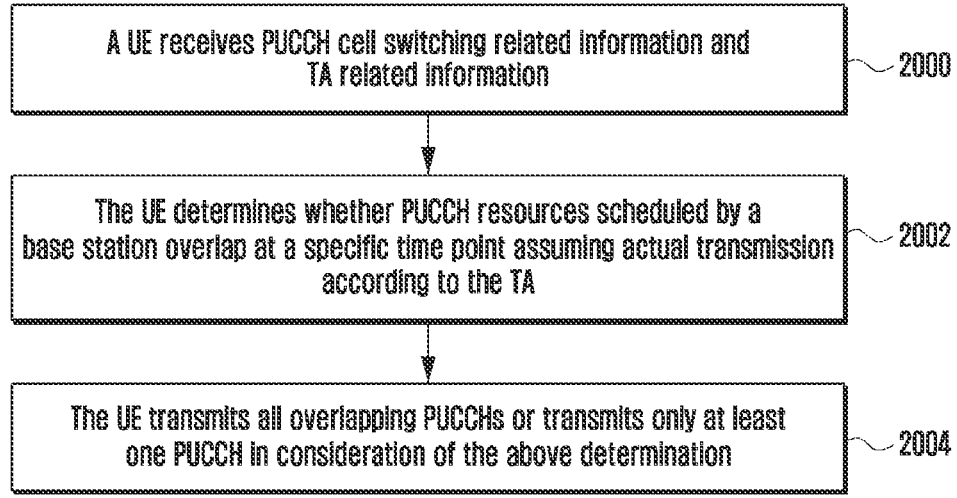

A UE receives PUCCH cell switching related information and
TA related information     ∽2000

The UE determines whether PUCCH resources scheduled by a
base station overlap at a specific time point assuming actual transmission
according to the TA     ∽2002

The UE transmits all overlapping PUCCHs or transmits only at least
one PUCCH in consideration of the above determination     ∽2004

METHOD AND APPARATUS FOR TRANSMITTING AND RECEIVING CONTROL INFORMATION BASED ON CELL SWITCHING IN WIRELESS COMMUNICATION SYSTEM

CROSS-REFERENCE TO RELATED APPLICATION(S)

This application is based on and claims priority under 35 U.S.C. § 119(a) to Korean Patent Application No. 10-2021-0149991, filed on Nov. 3, 2021, in the Korean Intellectual Property Office, the entire disclosure of which is incorporated herein by reference.

BACKGROUND

1. Field

The disclosure relates generally wireless communication system transmissions, and more particularly, to a method and apparatus for transmitting and receiving control information based on cell switching in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 60 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-stream transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

As a variety of services can be provided with the development of a wireless communication system, a method for effectively providing these services is required.

SUMMARY

In a wireless communication system, when a hybrid automatic repeat request (HARQ)-acknowledgement (ACK) transmission is delayed at a terminal, it causes a delay in retransmission of a physical downlink shared channel (PDSCH), and thus, causes a problem of increasing a delay time for overall data transmission and reception.

Accordingly, an aspect of the disclosure is to provide a method for processing a control signal in a wireless communication system. The method includes receiving a first control signal transmitted from a base station; processing the received first control signal; and transmitting a second control signal generated based on the processing to the base station.

Another aspect of the disclosure is to provide a terminal may construct an HARQ-ACK codebook in a situation of performing transmission of one or more HARQ-ACKs in one slot. In addition, the terminal may transmit PUCCH in one slot in a carrier aggregation situation.

In accordance with an aspect of the disclosure, a method performed by a terminal in a wireless communication system is provided. The method includes transmitting, to a base station, capability information of the terminal; receiving, from the base station, configuration information related to PUCCH cell switching according to the capability information; and transmitting, to the base station, a PUCCH on one of a plurality of serving cells for the PUCCH cell switching based on the configuration information. The plurality of serving cells for the PUCCH cell switching are in a same timing advance group (TAG).

In accordance with another aspect of the disclosure, a method performed by a base station in a wireless communication system is provided. The method includes receiving, from a terminal, capability information of the terminal; transmitting, to the terminal, configuration information related to PUCCH cell switching based on the capability information; and receiving, from the terminal, a PUCCH on one of a plurality of serving cells for the PUCCH cell switching according to the configuration information. The plurality of serving cells for the PUCCH cell switching are in a same TAG.

In accordance with another aspect of the disclosure, a terminal in a wireless communication system is provided. The terminal includes a transceiver and a controller. The controller is configured to transmit, to a base station via the transceiver, capability information of the terminal, receive, from the base station via the transceiver, configuration information related to PUCCH cell switching according to the capability information, and transmit, to the base station via the transceiver, a PUCCH on one of a plurality of serving cells for the PUCCH cell switching based on the configuration information. The plurality of serving cells for the PUCCH cell switching are in a same TAG.

In accordance with another aspect of the disclosure, a base station in a wireless communication system is provided. The base station includes a transceiver and a controller. The controller is configured to receive, from a terminal via the transceiver, capability information of the terminal, transmit, to the terminal via the transceiver, configuration information related to PUCCH cell switching based on the capability information, and receive, from the terminal via the transceiver, a PUCCH on one of a plurality of serving cells for the PUCCH cell switching according to the configuration information. The plurality of serving cells for the PUCCH cell switching are in a same TAG.

BRIEF DESCRIPTION OF THE DRAWINGS

The above and other aspects, features, and advantages of the present disclosure will be more apparent from the following detailed description when taken in conjunction with the accompanying drawings, in which:

FIG. 8 illustrates a situation in which an uplink control channel and data channel having different priorities overlap with each other in view of time resources in one cell;

FIG. 19 illustrates a case in which a timing advanced (TA) value is different between cells capable of cell switching for PUCCH transmission, according to an embodiment;

FIG. 20 is a flowchart illustrating an operation of a UE supporting PUCCH transmission based on cell switching, according to an embodiment;

DETAILED DESCRIPTION

Figure 1:
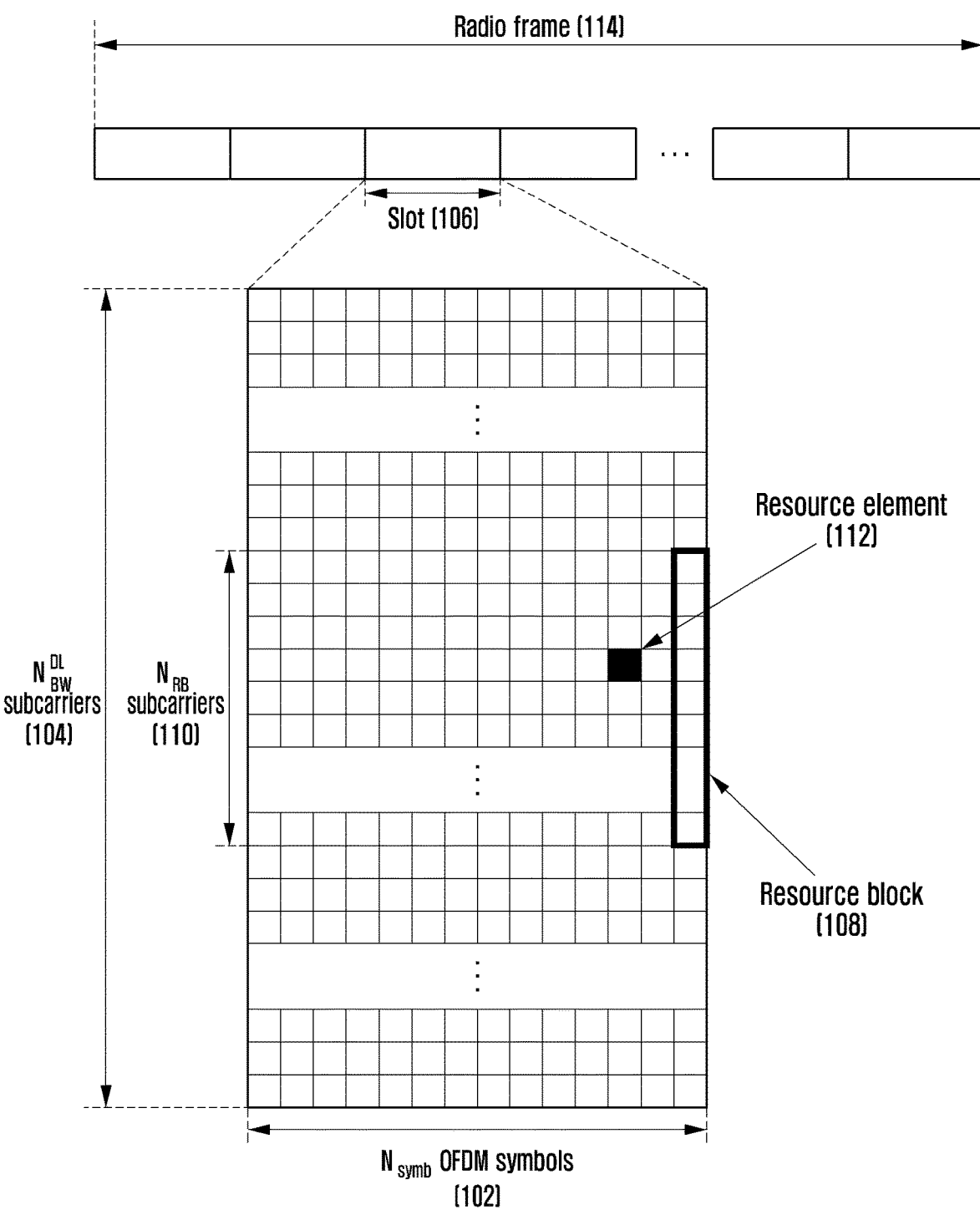
FIG. 1 illustrates a transmission structure of a time-frequency domain, which is a radio resource region of a 5G system or NR system.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure.

For the same reason, some elements are exaggerated, omitted, or schematically illustrated in the accompanying drawings. In addition, the depicted size of each element does not fully reflect the actual size.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, the unit may include one or more processors.

Wireless communication system is evolving to a broadband wireless communication system that provides a high-speed and high-quality packet data service, like communication standards such as, for example, third generation partnership project (3GPP) high speed packet access (HSPA), long term evolution (LTE) (or evolved universal terrestrial radio access (E-UTRA)), LTE-advanced (LTE-A), high rate packet data (HRPD) of 3GPP2, ultra-mobile broadband (UMB), and 802.16e of IEEE. In addition, a 5G or NR communication standard is being made as a 5G wireless communication system.

As a representative example of the broadband wireless communication system, a 5G or NR system employs an orthogonal frequency division multiplexing (OFDM) scheme in a downlink (DL) and an uplink (UL). Specifically, a cyclic-prefix OFDM (CP-OFDM) scheme is employed in the downlink, and a discrete Fourier transform spreading OFDM (DFT-S-OFDM) scheme is employed together with the CP-OFDM in the uplink. The uplink refers to a radio link in which a terminal (UE or mobile station (MS)) transmits data or control signals to a base station (BS) (or gNode B), and the downlink refers to a radio link in which the base station transmits data or control signals to the terminal. This multiple access scheme generally allocates and operates time-frequency resources for carrying data or control information to be not overlapped for each user (that is, orthogonality is established), so that each user's data or control information can be distinguished.

The 5G or NR system employs a HARQ scheme for retransmitting corresponding data in a physical layer when a decoding failure occurs in the initial transmission. In the HARQ scheme, when failing to correctly decode data, a receiver sends information (e.g., negative acknowledgment (HACK)) indicating a decoding failure to a transmitter so that the transmitter can retransmit the data in the physical layer. The receiver may improve data reception performance by combining data retransmitted by the transmitter with data that has previously failed to be decoded. In addition, when correctly decoding data, the receiver sends information (e.g., ACK) indicating a decoding success to the transmitter so that the transmitter can transmit new data.

Meanwhile, NR access technology, which is a new 5G communication, is being designed to allow various services to be freely multiplexed in time and frequency resources. Thus, a signal waveform, numerology, reference signal, etc. may be dynamically or freely allocated according to the needs of the corresponding service. In order to provide an optimal service to a UE in wireless communication, it is important to optimize data transmission through measurement of channel quality and interference, and it is essential to measure an accurate channel status. However, unlike the 4G communication where channel and interference characteristics do not change significantly depending on frequency resources, the 5G channel is subject to a great change in the channel and interference characteristics depending on the service, so it is necessary to support a subset of frequency resource group (FRG) dimension for measuring them separately. Meanwhile, in the 5G or NR system, the types of supported services may be divided into categories such as eMBB, mMTC, and URLLC. The eMBB is a service that aims for a high-speed transmission of high-capacity data, the mMTC is a service that aims for UE power minimization and connectivity of multiple UEs, and the URLLC is a service that aims for high reliability and low latency. Depending on the type of service applied to the UE, different requirements may be applied.

Among the above-described services, because the URLLC service aims for high reliability and low latency, there may be a need to transmit control information and data information transmittable through a physical channel at a low coding rate. In case of control information, the repeated transmission function of control information has already been introduced in the LTE's machine type communication (MTC) or narrow band-Internet-of-things (NB-IoT) service. Because the purpose of this introduction was to provide high coverage for UEs having a small bandwidth, the latency time was not sufficiently considered. In addition, the minimum unit of control information repeated transmission is fixed in units of subframes based on LTE. In order to support the URLLC service in the NR system or 5G system, it is necessary to introduce a control information repeated trans-mission mode that can improve reliability while requiring a small latency time. Therefore, in the disclosure, a situation in which control information is repeatedly transmitted in a slot is basically considered. Additionally, a situation in which control information transmittable across a slot bound-ary is repeatedly transmitted is also considered. Through the operation provided in the disclosure, the UE is capable of detecting control information transmitted from the base station at a faster time with high reliability.

Herein, terms are defined in consideration of respective functions and may vary according to a user's or operator's intention or custom. Therefore, the definition should be made based on the content throughout this specification. Hereinafter, a base station (BS) is a subject performing resource allocation of a UE and may be at least one of a gNode B (gNB), an eNode B (eNB), a Node B, a radio access unit, a base station controller, or a node on the network. A terminal may include a UE, an MS, a cellular phone, a smart phone, a computer, or a multimedia system capable of performing a communication function. Herein, a DL refers to a wireless transmission path of a signal trans-mitted from the base station to the UE, and an UL refers to a wireless transmission path of a signal transmitted from the UE to the base station. In addition, although the disclosure will be described hereinafter based on the NR system, embodiments of the disclosure may also be applied to various communication system having a similar technical background or channel type. In addition, embodiments of the disclosure may be applied to any other communication system through some modifications within a range that does not significantly depart from the scope of the disclosure as being apparent to a person skilled in the art.

In the disclosure, typical terms of a physical channel and a signal may be used interchangeably with data or a control signal. For example, although a PDSCH or a physical uplink shared channel (PUSCH) is a physical channel through which data is transmitted, transmission/reception of PDSCH or PUSCH in the disclosure may be understood as trans-mission/reception of data through PDSCH or PUSCH. Simi-larly, although a physical downlink control channel (PDCCH) or a PUCCH is a physical channel through which a control signal is transmitted, transmission/reception of PDCCH or PUCCH in the disclosure may be understood as transmission/reception of a control signal through PDSCH or PUSCH.

Herein, higher signaling refers to a signal transmission method from the base station to the UE using a downlink data channel of a physical layer or from the UE to the base station using an uplink data channel of a physical layer, and may also be referred to as radio resource control (RRC) signaling or a medium access control (MAC) control ele-ment (CE).

As research on a next-generation communication system is in progress, various schemes for scheduling communica-tion with the UE are being discussed. Thus, there is a need for schemes of efficient scheduling and data transmission/ reception in consideration of the characteristics of the next-generation communication system. Accordingly, in order to provide a plurality of services to the user in the communi-cation system, a method and apparatus capable of providing the respective services within the same time interval to be suited for the characteristics of the corresponding services are required.

The NR system employs a HARQ scheme for retransmit-ting corresponding data in a physical layer when a decoding failure occurs in the initial transmission. In the HARQ scheme, when failing to correctly decode data, a receiver sends information (e.g., NACK) indicating a decoding fail-ure to a transmitter so that the transmitter can retransmit the data in the physical layer. The receiver may improve data reception performance by combining data retransmitted by the transmitter with data that has previously failed to be decoded. In addition, when correctly decoding data, the receiver sends information (e.g., ACK) indicating a decod-ing success to the transmitter so that the transmitter can transmit new data.

Hereinafter, a method and apparatus for transmitting HARQ-ACK feedback in response to downlink data trans-mission is described. Specifically, a method of constructing HARQ-ACK feedback bits when the UE intends to transmit multiple HARQ-ACKs in one slot through uplink will be described.

In the wireless communication system, especially, the NR system, the base station may configure one component carrier (CC) or a plurality of CCs for downlink transmission to the UE. In addition, downlink transmission and uplink transmission slots and symbols may be configured in each CC.

Meanwhile, when a PDSCH, which is downlink data, is scheduled, at least one of slot timing information on PDSCH mapping, position information on a start symbol of PDSCH mapping in the corresponding slot, and information on the number of symbols mapped by the PDSCH may be trans-mitted through a specific bit field of downlink control information (DCI). For example, when the DCI scheduling the PDSCH is transmitted in slot n, and if K0, which is slot timing information on PDSCH transmission, indicates 0, a start symbol position is 0, and a symbol length is 7, the corresponding PDSCH is mapped to seven symbols from the symbol 0 in the slot n and transmitted.

After K1 slot from transmission of PDSCH, which is a downlink data signal, the HARQ-ACK feedback may be transmitted from the UE to the base station. K1 information, which is timing information on HARQ-ACK transmission, may be transmitted through the DCI. A candidate set of possible K1 values may be delivered via higher signaling, and one of them may be determined through the DCI.

When the UE is configured with a semi-static HARQ-ACK codebook, the UE may determine the feedback bit (or HARQ-ACK codebook size) to be transmitted, based on a table including at least one of slot information K0, start symbol information, the number of symbols, and length information, in relation to PDSCH mapping, and based on K1 candidate values of HARQ-ACK feedback timing information for PDSCH. The table including at least one of slot information, start symbol information, the number of symbols, and length information, in relation to PDSCH mapping, may have default values or may be configured in the UE by the base station.

When the UE is configured with a dynamic HARQ-ACK codebook, the UE may determine the HARQ-ACK feedback bit (or HARQ-ACK codebook size) to be transmitted by the UE, based on downlink assignment indicator (DAI) information included in the DCI in a slot for transmission of HARQ-ACK information determined according to slot information K0 on PDSCH mapping and HARQ-ACK feedback timing information K1 value for PDSCH.

According to embodiments, a method and an apparatus are provided for constructing a HARQ-ACK codebook in a situation where a UE performs one or more HARQ-ACK transmissions in one slot.

In addition, hereinafter, a method and an apparatus are provided for transmitting HARQ-ACK feedback for downlink data transmission in a carrier aggregation (CA) environment.

In 3GPP LTE Rel-10, a bandwidth extension technology has been adopted to support a larger amount of data transmission compared to LTE Rel-8. This technology, called bandwidth extension or CA, extends a band and thereby increases the amount of data transmission by the extended band compared to LTE Rel-8 UE that transmit data in one band. Each of the above bands is called a CC, and the LTE Rel-8 UE is defined to have one CC for each of downlink and uplink. In addition, the downlink CC and the uplink CC connected via SIB-2 are collectively called a cell. The system information block (SIB)-2 connection relationship between the downlink CC and the uplink CC is transmitted via a system signal or a higher signal. The UE that supports the CA may receive downlink data and transmit uplink data, through a plurality of serving cells.

In the Rel-10, when it is difficult for the base station to send a PDCCH to a specific UE in a specific serving cell, the base station may configure a carrier indicator field (CIF) as a field for notifying that the PDCCH is transmitted in another serving cell and the corresponding PDCCH indicates a PDSCH or PUSCH of another serving cell. The CIF may be configured for the UE supporting the CA. The CIF may indicate another serving cell by adding 3 bits to PDCCH information in a specific serving cell. The CIF is included only in case of cross-carrier scheduling. If the CIF is not included, the cross-carrier scheduling is not to be performed. When the CIF is included in downlink assignment information (e.g., DL assignment), the CIF indicates a serving cell in which the PDSCH scheduled by the DL assignment will be transmitted. When the CIF is included in uplink resource assignment information (e.g., UL grant), the CIF indicates a serving cell in which the PUSCH scheduled by the UL grant will be transmitted.

As described above, in the LTE Rel-10, the CA, which is a bandwidth extension technique, is defined, and a plurality of serving cells may be configured for the UE. In addition, for data scheduling of the base station, the UE may periodically or aperiodically transmit channel information on the plurality of serving cells to the base station. The base station schedules and transmits data for each carrier, and the UE transmits ACK/NACK (A/N) feedback for the data transmitted for each carrier. The LTE Rel-10 has been designed to transmit the A/N feedback of up to 21 bits. When the transmission of A/N feedback and channel information overlap with each other in one subframe, it has been designed to transmit the A/N feedback and discard the channel information. In the LTE Rel-11, it has been designed to multiplex the channel information of one cell together with the A/N feedback and transmit the A/N feedback of up to 22 bits and the channel information of one cell in a transmission resource of PUCCH format 3.

In LTE Rel-13, a scenario of configuring up to 32 serving cells is assumed, and the concept of extending the number of serving cells to a maximum of 32 using an unlicensed band as well as a licensed band has been discussed. In this case, there is a risk that the transmission of channel information for a plurality of serving cells in one subframe may collide with each other, and a new PUCCH format has been designed to be able to transmit a plurality of channel information or A/N feedback at once. Thus, a method is required to support a UE operation when multiplexing channel information or A/N feedback for as many serving cells as possible in one subframe under various conditions. That is, a need arises for a method in which the UE determines a transmission operation and transmission resource of channel information or A/N feedback to be transmitted, and transmits the channel information and A/N feedbacks alone or in combination by using the transmission format mapped to the transmission resource, in a situation of considering a condition such as the number of serving cells configured for the UE, the type of PUCCH format configured for the UE, simultaneous transmission or not of PUCCH and PUSCH configured for the UE, or PUCCH transmission in a secondary cell other than a primary cell configured for the UE.

The carrier aggregation in the 5G NR has the same most operational functions as those of the carrier aggregation applied in the LTE, but there are different parts in terms of PUCCH transmission. For example, in the LTE, the PUCCH format is determined depending on whether UCI to be transmitted via PUCCH is a scheduling request (SR), HARQ-ACK, channel state information (CSI), or combined information, whereas, in the NR, the PUCCH format is determined depending on the number of uplink control information (UCI) bits regardless of SR, HARQ-ACK, or CSI. Specifically, the PUCCH format is determined depending on a time resource length (number of symbols) of PUCCH and the number of UCI bits.

The CCs supported for the carrier aggregation may exist in the same frequency band or in different frequency bands, and there are three carrier aggregation scenarios as follows.
1. Intraband aggregation with frequency-contiguous CCs
2. Intraband aggregation with non-contiguous CCs
3. Interband aggregation with non-contiguous CCs Although the structures according to the above scenarios are all the same, the degree of RF complexity may vary according to individual scenarios. Unlike the LTE, the NR supports up to 16 carriers, and supports different frequency bandwidth sizes and a duplex mode. The maximum size of one carrier is about 400 MHz in the NR, and if all 16 carriers have this size, a bandwidth of up to 6.4 GHz can be supported theoretically through the carrier aggregation. The UE supporting the carrier aggregation in the same way as in the LTE may support simultaneous reception or transmission for two or more carriers. In the third scenario among the above scenarios, it may be possible to have different TDD configurations for respective carriers. Because of having different frequency bands, different carriers do not need to have the same transmission direction. Thus, unlike the UE that does not support the carrier aggregation, the UE that supports the carrier aggregation may require a duplex filter to handle the above situation. In the 3GPP standard, the carrier aggregation can be described through the term cell. Accordingly, the UE supporting the carrier aggregation can transmit and receive information with multiple cells. One of these cells is referred to as a primary cell (pCell) and refers to a cell that the UE initially finds and connects to. After that, secondary cells (SCells) may be configured via a higher signal and activated or deactivated via MAC CE or RRC. For example, a bitmap of the MAC GE may indicate the activation or deactivation of secondary cells configured through a higher layer. Also, the number of downlink cells and the number of uplink cells may be equal to or different from each other, and in other cases the number of downlink cells may be generally greater than the number of uplink cells.

According to embodiments, a method and an apparatus are provided for a UE to transmit a PUCCH in one slot in a carrier aggregation situation.

FIG. 1 is a diagram illustrating a transmission structure of a time-frequency domain, which is a radio resource region of a 5G system or NR system.

With reference to FIG. 1, in the radio resource region, the horizontal axis represents the time domain, and the vertical axis represents the frequency domain. The minimum transmission unit in the time domain is an OFDM symbol, and $N_{symb}$ OFDM symbols 102 constitute one slot 106. The length of a subframe is defined as 1.0 ms, and a radio frame 114 is defined as 10 ms. The minimum transmission unit in the frequency domain is a subcarrier, and the bandwidth of the entire system transmission band is composed of $N_{BW}$ subcarriers 104. However, these specific values may be vary depending on the system.

A basic unit of a resource in the time-frequency domain is a resource element (RE) 112, which may be represented with an OFDM symbol index and a subcarrier index. A resource block (RB) 108 or physical resource block (PRB) is defined as consecutive $N_{symb}$ OFDM symbols 102 in the time domain and consecutive $N_{RB}$ subcarriers 110 in the frequency domain. Therefore, one RB 108 is composed of $N_{symb} \times N_{RB}$ number of REs 112.

In general, the minimum transmission unit of data is an RB unit. In the 5G or NR system, $N_{symb}$ is 14, $N_{RB}$ is 12, and $N_{BW}$ and $N_{RB}$ may be proportional to the bandwidth of the system transmission band. Also, a data rate increases in proportion to the number of RBs scheduled for a UE. In the 5G or NR system, in case of the FDD system that divides downlink and uplink by frequency, a downlink transmission bandwidth and an uplink transmission bandwidth may be different from each other. A channel bandwidth may represent an RF bandwidth corresponding to the system transmission bandwidth. Table 1 below shows a corresponding relationship between a system transmission bandwidth and a channel bandwidth defined in the LTE system, which is the 4G wireless communication before the 5G or NR system. For example, the LTE system having a 10 MHz channel bandwidth may be configured with a transmission bandwidth of 50 RBs.

TABLE 1

| | Channel bandwidth BW$_{Channel}$ [MHz] | | | | | |
| | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

In the 5G or NR system, it can operate in a wider channel bandwidth than the LTE channel bandwidth presented in Table 1. Table 2 shows a corresponding relationship among a system transmission bandwidth, a channel bandwidth, and a subcarrier spacing (SCS) in the 5G or NR system.

TABLE 2

| | SCS | Channel bandwidth BW$_{Channel}$ [MHz] | | | | | | | | |
| | [kHz] | 5 | 10 | 15 | 20 | 25 | 40 | 50 | 60 | 80 | 100 |
|---|---|---|---|---|---|---|---|---|---|---|---|
| Maximum Transmission bandwidth $N_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

In the 5G or NR system, scheduling information for downlink data or uplink data is delivered from a base station to a UE through DCI. The DCI is defined according to various formats and, based on each format, may indicate whether it is scheduling information (e.g., UL grant) for uplink data or scheduling information (e.g., DL grant) for downlink data, whether it is a compact DCI with a small size of control information, whether spatial multiplexing using multiple antennas is applied, whether it is DCI for power control, and the like. For example, DCI format 1-1, which is scheduling control information (e.g., DL grant) for downlink data, may include at least one of the following types of control information.

Carrier indicator: This indicates a frequency carrier where transmission is performed.

DCI format indicator: This is an indicator for distinguishing whether the corresponding DCI is for downlink or uplink.

BWP indicator: This indicates a BWP where transmission is performed.

Frequency domain resource allocation: This indicates an RB in the frequency domain allocated for data transmission. A resource to be expressed is determined according to the system bandwidth and the resource allocation scheme.

Time domain resource allocation: This indicates an OFDM symbol and a slot to be used for transmission of a data-related channel.

Virtual RB (VRB)-to-physical RB (PRB) mapping: This indicates a mapping scheme between a VRB index and a PRB index.

MCS: This indicates a modulation scheme and a coding rate used for data transmission. That is, this may indicate information about quadrature phase shift keying (QPSK), 16 quadrature amplitude modulation (16QAM), 64QAM, or 256QAM, and a coding rate value that informs a transport block size (TBS) and channel coding information.

Code block group (CBG) transmission information: This indicates information about a CBG transmitted when CBG retransmission is configured.

HARQ process number: This indicates the process number of HARQ.

New data indicator: This indicates whether HARQ initial transmission or retransmission.

Redundancy version: This indicates a redundancy version of HARQ.

Transmit power control (TPC) command for PUCCH: This indicates a TPC command for PUCCH which is an uplink control channel.

In case of PUSCH transmission, time domain resource assignment may be transmitted via information on a slot for PUSCH transmission, a start symbol position S in that slot, and the number of symbols L to which PUSCH is mapped. Here, S may be a relative position from the start of the slot, L may be the number of consecutive symbols, and S and L may be determined from a start and length indicator value (SLIV) defined as Equation (1) below.

```
If (L−1) ≤ 7 then
    SLIV = 14·(L−1)+S
else
    SLIV = 14·(14−L+1)+(14−1−S)
where 0 < L ≤ 14−S
                                    ...(1)
```

In the 5G or NR system, generally through RRC configuration, a table including, in one row, information about a SLIV value, a PUSCH mapping type, and a slot for PUSCH transmission may be configured. Then, in time domain resource allocation of DCI, an index value in the configured table is indicated so that the base station can transmit to the UE the information about a SLIV value, a PUSCH mapping type, and a slot for PUSCH transmission.

In the 5G or NR system, the PUSCH mapping type is defined as type A and type B. In the PUSCH mapping type A, the first OFDM symbol among demodulation reference signal (DMRS) OFDM symbols is located in the second or third OFDM symbol in the slot. In the PUSCH mapping type B, the first OFDM symbol among DMRS OFDM symbols is located in the first OFDM symbol in the time domain resource allocated for PUSCH transmission. This method of PUSCH time domain resource allocation may be equally applicable to PDSCH time domain resource allocation.

The DCI may be transmitted on a PDCCH (or control information, hereinafter used interchangeably) after a channel coding and modulation process.

In general, the DCI is scrambled with a specific radio network temporary identifier (RNTI) (or UE identifier) independently for each UE, adds a cyclic redundancy check (CRC), is channel-coded, is configured as each independent PDCCH, and is transmitted. The PDCCH is mapped and transmitted in a control resource set (CORESET) configured for the UE.

Downlink data may be transmitted on a PDSCH, which is a physical channel for downlink data transmission. The PDSCH may be transmitted after a control channel transmission interval, and scheduling information such as a specific mapping position in the frequency domain and a modulation scheme is determined based on the transmitted through the PDCCH.

Through the MCS among control information types constituting the DCI, the base station may notify the UE of a modulation scheme applied to the PDSCH to be transmitted and the size (TBS) of data to be transmitted. The MCS may consist of 5 bits or more or fewer bits. The TBS corresponds to the size before the channel coding for error correction is applied to data (transport block (TB)) to be transmitted by the base station.

Herein, the TB may include a MAC header, a MAC CE, one or more MAC service data units (SDUs), and padding bits. Alternatively, the TB may indicate a data unit or MAC protocol data unit (PDU) that is delivered from the MAC layer to the physical layer.

The modulation schemes supported in the NR system are QPSK, 16QAM, 64QAM, and 256QAM, and each modulation order (Qm) corresponds to 2, 4, 6, or 8. That is, 2 bits per symbol may be transmitted in case of QPSK modulation, 4 bits per symbol in case of 16QAM modulation, 6 bits per symbol in case of 64QAM modulation, and 8 bits per symbol in case of 256QAM modulation.

In the 5G or NR system, when the UE receives a PDSCH or PUSCH schedule via DCI, and when the time resource allocation field index included in the DCI indicates m, this indicates a combination of DMRS Type A position information corresponding to m+1, PDSCH mapping type information, a slot index K0, a data resource start symbol S, and a data resource allocation length L in the table indicating time domain resource allocation information. For example, Table 3 includes PDSCH time domain resource allocation information based on a normal cyclic prefix.

TABLE 3

| Row index | dtnrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dmrs-TypeA-Position is a field indicating the symbol position at which DMRS is transmitted in one slot indicated by SIB which is one of UE common control information. A possible value for this field is 2 or 3. When the number of symbols constituting one slot is 14 in total and the first symbol index is 0, 2 denotes the third symbol and 3 denotes the fourth symbol, In Table 3, the PDSCH mapping type is information indicating the location of DMRS in the scheduled data resource region. In case of PDSCH mapping type A, the DMRS is always transmitted and received at the symbol position determined in dmrs-TypeA-Position regardless of a time domain resource of allocated data.

In case of PDSCH mapping type B, the DMRS is always transmitted and received in the first symbol among time domain resources of allocated data. In other words, the PDSCH mapping type B does not use dmrs-TypeA-Position information.

In Table 3, $K_0$ denotes an offset between a slot index to which a PDCCH for DCI transmission belongs and a slot index to which a PDSCH or PUSCH scheduled in the DCI belongs. For example, when the slot index of the PDCCH is n, the slot index of the PDSCH or PUSCH scheduled in the DCI of the PDCCH is $n+K_0$.

In Table 3, S denotes a start symbol index of a data time domain resource within one slot. The range of possible values of S is 0 to 13 based on the normal cyclic prefix.

TABLE 4-continued

| Row index | PUSCH mapping type | $K_2$ | S | L |
|---|---|---|---|---|
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Table 5 shows possible combinations of S and L according to whether the cyclic prefix is normal or extended and whether the PDSCH mapping type is type A or type B.

TABLE 5

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . 14} | {3, . . . 14} | {0, 1, 2, 3} (Note 1) | {3, . . . 12} | {3, . . . 12} |
| Type B | {0, . . . 12} | [2, 4, 7] | {2, . . . 14} | {0, . . . 10} | {2, 4, 6} | {2, . . . 12} |

(Note 1):
S = 3 is applicable only if dmrs – Type A – Position = 3

In Table 3, L denotes the length of a data time domain resource interval within one slot. The range of possible values of L is 1 to 14. However, possible values of S and L Table 6 shows possible combinations of S and L according to whether the cyclic prefix is normal or extended and whether the PUSCH mapping type is type A or type B.

TABLE 6

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} | are determined by the above Equation 1 and Table 5 or Table 6. Table 3 may be values used as default by the UE before receiving time resource allocation information through UE-specific or UE-common higher signaling. For example, DCI format 0_0 or 1_0 may always use Table 3 as a default time resource region value.

Table 3 shows PDSCH time domain resource allocation values, and for PUSCH time domain resource allocation, the K0 value is replaced with the K2 value. Table 4 is an example of a PUSCH time domain resource allocation table based on a normal cyclic prefix.

TABLE 4

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |

In Table 4, each index may be configured through a higher signaling parameter PDSCH-TimeDomainResourceAllocationList or PUSCH-TimeDomainResourceAllocationList.

PDSCH-TimeDomainResourceAllocationList consists of one or more higher signaling parameters PDSCH-TimeDomainResourceAllocation, and there are k0, mappingtype, and startSymbolAndLength in PDSCH-TimeDomainResourceAllocation. The possible value range of k0 is 0 to 32. Mappingtype may correspond to type A or type B. The possible value range of StartSymbolAndLength is 0 to 127. As described above, when the mappingtype is type A, the symbol position of DMRS follows the value indicated by dmrs-typeA-Position.

PUSCH-TimeDomainResourceAllocationList consists of one or more higher signaling parameters PUSCH-TimeDomainResourceAllocation, and there are k2, mapping type, and startSymbolAndLength in PUSCH-TimeDomainResourceAllocation. The possible value range of k2 is 0 to 32. Mappingtype may correspond to type A or type B. The possible value range of StartSymbolAndLength is 0 to 127. As described above, when the mappingtype is type A, the symbol position of DMRS follows the value indicated by dmrs-typeA-Position.

The above-described PDSCH-TimeDomainResourceAllocation or PUSCH-TimeDomainResourceAllocation is a method of allocating time domain resources for PDSCH or PUSCH within one slot. The higher signaling aggregationFactorDL denotes the number of slots in which the PDSCH-TimeDomainResourceAllocation value applied in one slot is repeatedly transmitted. The higher signaling aggregationfactorUL denotes the number of slots in which the PUSCH-TimeDomainResourceAllocation value applied in one slot is repeatedly transmitted. The possible value range of aggregationFactorDL and aggregationFactorUL is {1, 2, 4, 8}. For example, when aggregationFactorDL is 8, it means that one of possible PDSCH-TimeDomainResourceAllocation values is repeatedly transmitted over a total of 8 slots. However, when at least some of the symbols applied to PDSCH-TimeDomainResourceAllocation in a specific slot are uplink symbols, PDSCH transmission/reception in that slot is omitted. Similarly, when at least some of the symbols applied to PUSCH-TimeDomainResourceAllocation in a specific slot are downlink symbols, PUSCH transmission/reception in that slot is omitted.

Figure 2:
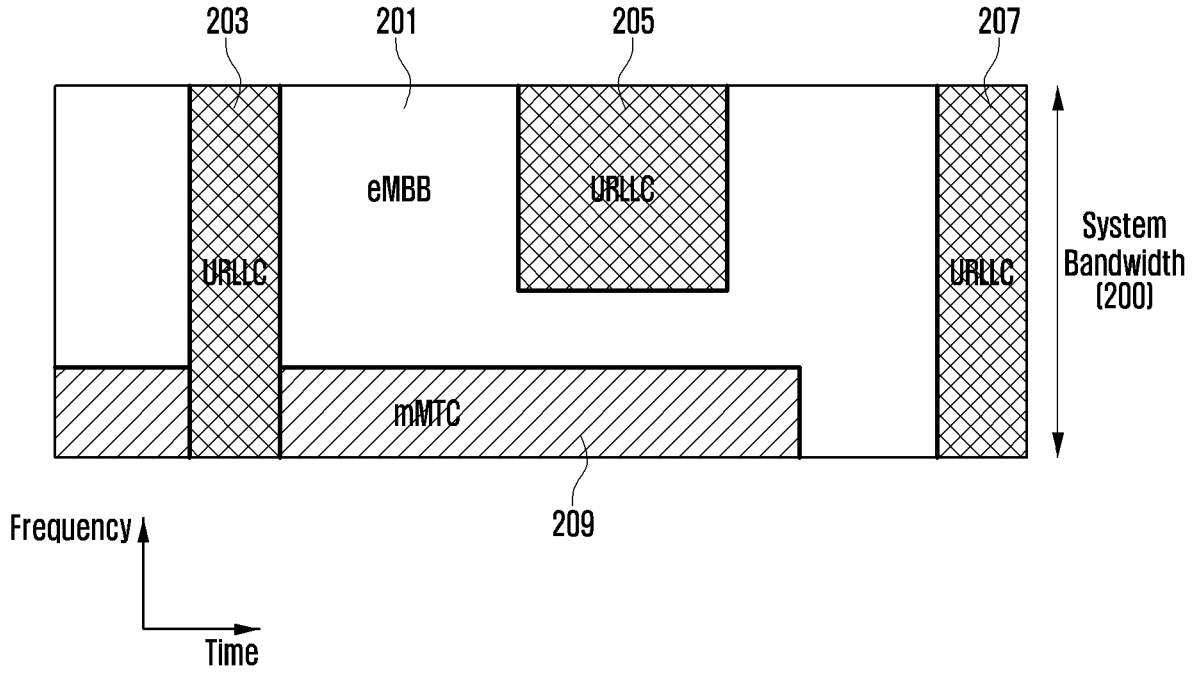
FIG. 2 illustrates a method for allocating data for eMBB, URLLC, and mMTC in a time-frequency resource domain in a 5G system or NR system.

FIG. 2 is a diagram illustrating a method for allocating data for eMBB, URLLC, and mMTC in a time-frequency resource domain in a 5G system or NR system.

With reference to FIG. 2, in an entire system frequency band 200, data for eMBB, URLLC, and mMTC may be allocated. In case that the transmission of URLLC data 203, 205, or 207 is needed while eMBB 201 and mMTC 209 are allocated and transmitted in a specific frequency band, the URLLC data 203, 205, or 207 may be transmitted by emptying a part to which the eMBB 201 and the mMTC 209 have been already allocated, or may not be transmitted.

Because a URLLC service among the above-mentioned services needs to reduce a latency time, the URLLC data may be allocated to and transmitted in a part of resources to which the eMBB or the mMTC is allocated.

In case that the URLLC is additionally allocated to and transmitted in the resource to which the eMBB is allocated, eMBB data may not be transmitted in the overlapped frequency-time resource, and therefore, the transmission performance of the eMBB data may be lowered. For example, a failure in the eMBB data transmission may occur due to the URLLC allocation.

Figure 3:
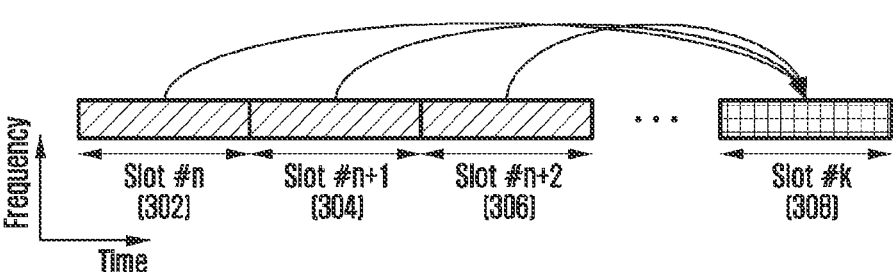
FIG. 3 illustrates a method for configuring a semi-static HARQ-ACK codebook in an NR system.

FIG. 3 is a diagram illustrating a method for configuring a semi-static HARQ-ACK codebook in an NR system.

When the UE receives higher layer signaling for configuring a semi-static HARQ-ACK codebook in a situation in which a HARQ-ACK PUCCH that the UE can transmit in one slot is limited to one, the UE may report HARQ-ACK information for PDSCH reception or SPS PDSCH release, within the HARQ-ACK codebook, in a slot indicated by the value of a PDSCH-to-HARQ_feedback timing indicator in DCI format 1_0 or DCI format 1_1.

The UE may report a HARQ-ACK information bit value through NACK, within the HARQ-ACK codebook, in a slot not indicated by the PDSCH-to-HARQ feedback timing indicator field in DCI format 1_0 or DCI format 1_1.

If, in $M_{A,C}$ cases for candidate PDSCH reception, the UE reports only HARQ-ACK information for one SPS PDSCH release or one PDSCH reception, and if the report is scheduled by DCI format 1_0 including information indicating that the counter DCI field is 1 in the PCell, the UE may determine one HARQ-ACK codebook for the corresponding SPS PDSCH release or the corresponding PDSCH reception.

The other cases may follow a HARQ-ACK codebook determination method described hereinafter.

Assuming that the set of PDSCH reception candidate cases in the serving cell c is $M_{A,C}$, the $M_{A,C}$ can be obtained by the following [pseudo-code 1] steps.

Step 1: Initialize j to 0 and $M_{A,C}$ to the empty set. Initialize k, which is the HARQ-ACK transmission timing index, to 0.

Step 2: Configure R as the set of rows in a table including slot information, start symbol information, the number of symbols, or length information, related to PDSCH mapping. If the PDSCH-capable mapping symbol indicated by each value of R is configured as the UL symbol in accordance with the DL and UL configuration via higher level, delete the corresponding row from R.

Step 3-1: If the UE can receive one PDSCH for unicast in one slot and R is not an empty set, add one to the set $M_{A,C}$.

Step 3-2: If the UE can receive more than one PDSCH for unicast in one slot, count the number of PDSCHs that can be assigned to different symbols in the calculated R, and add the corresponding number to $M_{A,C}$.

Step 4: Restart from Step 2. by increasing k by 1.

With reference to FIG. 3 for the above-described pseudo-code 1, in order to perform HARQ-ACK PUCCH transmission in slot #k 308, all slot candidates capable of PDSCH-to-HARQ ACK timing that can indicate the slot #k 308 are considered.

In FIG. 3, it is assumed that HARQ-ACK transmission is possible in the slot #k 308 by a PDSCH-to-HARQ-ACK timing combination of only PDSCHs scheduled in slot #n 302, slot #n+1 304, and slot #n+2 306. In addition, the maximum number of schedulable PDSCHs for each slot is derived in consideration of time domain resource configuration information of PDSCH schedulable in each of the slots 302, 304, and 306 and information indicating whether a symbol in the slot is downlink or uplink.

For example, if the maximum scheduling is possible for two PDSCHs in the slot 302, three PDSCHs in the slot 304, and two PDSCHs in the slot 306, the maximum number of PDSCHs included in the HARQ-ACK codebook transmitted in the slot 308 is 7 in total. This is called cardinality of the HARQ-ACK codebook.

Figure 4:
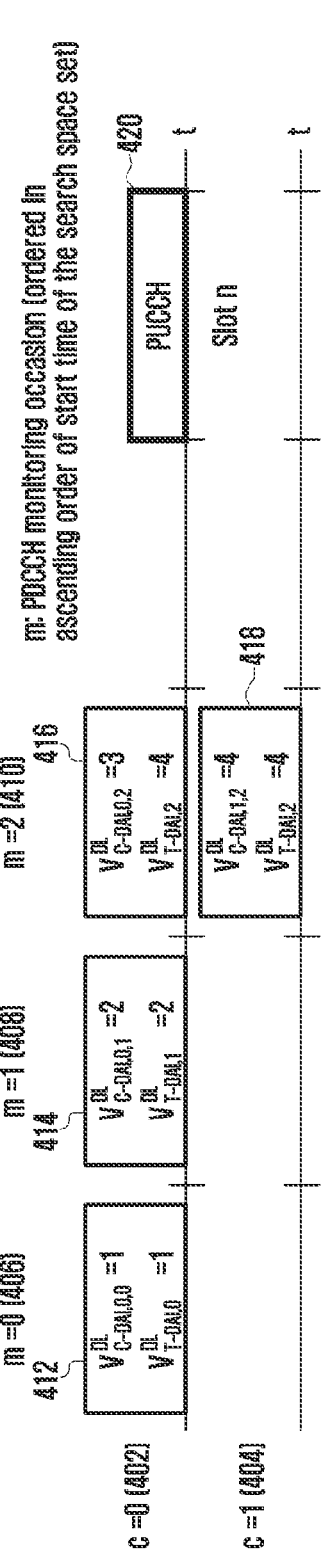
FIG. 4 illustrates a method for configuring a dynamic HARQ-ACK codebook in an NR system.

FIG. 4 is a diagram illustrating a method for configuring a dynamic HARQ-ACK codebook in an NR system.

Based on a PDSCH-to-HARQ_feedback timing value for PUCCH transmission of HARQ-ACK information in slot n for PDSCH reception or SPS PDSCH release, and K0 which is transmission slot position information of PDSCH scheduled in DCI format 1_0 or 1_1, the UE transmits the HARQ-ACK information transmitted within one PUCCH in the corresponding slot n. Specifically, for the above-described HARQ-ACK information transmission, the UE determines the HARQ-ACK codebook of the PUCCH transmitted in the slot determined by the PDSCH-to-HARQ_feedback timing and K0, based on a DAI included in the DCI indicating the PDSCH reception or SPS PDSCH release.

The DAI consists of a counter DAI and a total DAI. The counter DAI is information indicating, in the HARQ-ACK codebook, the location of HARQ-ACK information corresponding to the PDSCH scheduled in DCI format 1_0 or DCI format 1_1. Specifically, the counter DAI value in DCI format 1_0 or 1_1 informs the cumulative value of PDSCH reception or SPS PDSCH release scheduled by DCI format 1_0 or DCI format 1_1 in a specific cell c. This cumulative value is configured based on a PDCCH monitoring occasion and a serving cell in which the scheduled DCI exists.

The total DAI is a value indicating the size of the HARQ-ACK codebook. Specifically, the value of total DAI refers to the total number of PDSCH receptions or SPS PDSCH releases previously scheduled including a time point at which DCI is scheduled. In addition, the total DAI is used when the HARQ-ACK information in the serving cell c also includes HARQ-ACK information for the PDSCH scheduled in another cell including the serving cell c in a carrier aggregation (CA) situation. In other words, there is no total DAI parameter in a system operating with one cell.

An operation example for the DAI is shown in FIG. 4. FIG. 4 is a diagram illustrating, when the UE transmits the HARQ-ACK codebook selected based on the DAI via a PUCCH 420 in slot n of carrier 0 402 in a situation in which two carriers are configured, variations in the values of counter DAI (C-DAI) and total DAI (T-DAI) indicated by DCI searched for according to each PDCCH monitoring occasion configured for each carrier.

First, the DCI searched for at m=0 406 indicates a value 412 of 1 for each of C-DAI and T-DAI. The DCI found at m=1 408 indicates a value 414 of 2 for each of C-DAI and T-DAI. The DCI found in carrier 0 c=0) 402 of m=2 410 indicates a value 416 of 3 for C-DAI. The DCI found in carrier 1 (c=1) 404 of m=2 410 indicates a value 418 of 4 for C-DAI. At this time, when carriers 0 and 1 are scheduled on the same monitoring occasion, T-DAI is all indicated as 4.

HARQ-ACK codebook determination disclosed in FIGS. 3 and 4 represents an operation assuming a situation in which only one PUCCH containing HARQ-ACK information is transmitted within one slot. This is called mode 1. As an example of a method that one PUCCH transmission resource is determined within one slot, when PDSCHs scheduled via different DCIs are multiplexed into one HARQ-ACK codebook in the same slot and transmitted, a PUCCH resource selected for HARQ-ACK transmission may be determined as a PUCCH resource indicated by a PUCCH resource field in DCI that last scheduled the PDSCH. That is, a PUCCH resource indicated by the PUCCH resource field in DCI received before the DCI that last scheduled the PDSCH may be ignored.

The following description defines a method and an apparatus for determining a HARQ-ACK codebook in a situation in which two or more PUCCHs containing HARQ-ACK information can be transmitted in one slot. This is referred to as mode 2. The UE may operate in only mode 1 (transmitting only one HARQ-ACK PUCCH in one slot) or in only mode 2 (transmitting one or more HARQ-ACK PUCCHs in one slot). Alternatively, the UE supporting both mode 1 and mode 2 may be configured with higher signaling by the base station to operate in only one mode, or mode 1 and mode 2 may be implicitly determined by DCI format, RNTI, DCI specific field value, scrambling, or the like. For example, a PDSCH scheduled in DCI format A and associated HARQ-ACK information may operate based on mode 1, and a PDSCH scheduled in DCI format B and associated HARQ-ACK information may operate based on mode 2.

Figure 5:
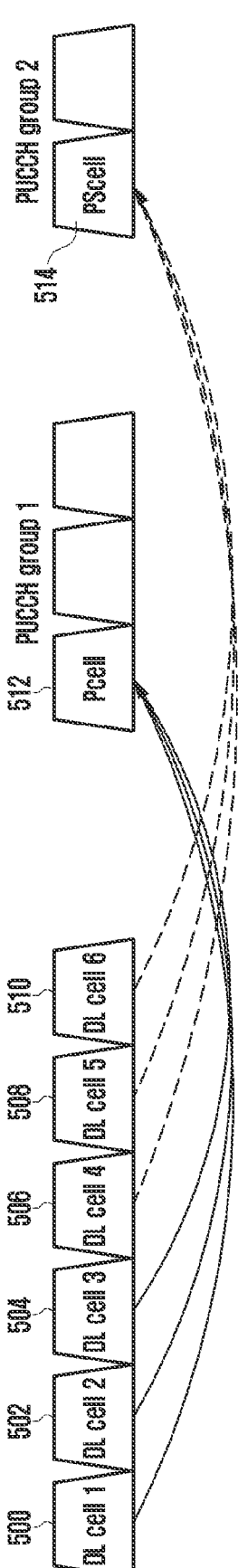
FIG. 5 illustrates the concept of a physical uplink control channel (PUCCH) cell associated with a downlink cell in a carrier aggregation situation.

FIG. 5 is a diagram illustrating the concept of a PUCCH cell associated with a downlink cell in a carrier aggregation situation.

HARQ-ACK information is basically used by the UE to notify the demodulation/decoding, result for a scheduled PDSCH to the base station. Basically, in the NR, all feedbacks (i.e., uplink control information, UCI) including HARQ-ACK information are transmitted via a primary cell. Because the number of downlink cells and the number of uplink cells may not be always equal to each other as described above, it is necessary to consider this. Accordingly, the HARQ-ACK information with respect to a plurality of downlink CCs may be transmitted/received through one uplink carrier. In case that the number of downlink CCs increases, the number of UCI bits for HARQ-ACK or other UCI information may increase, which may be a burden to transmit only on a single uplink carrier. In order to compensate for this problem, in the NR, two PUCCH groups are configured such that the first group transmits PUCCH including UCI information through PCell and the second group transmits PUCCH including UCI information through PSCell. FIG. 5 shows a related example. In PUCCH group 1, a PCell 512 is a cell in which PUCCH transmission/reception for downlink cells 500, 502, and 504 is performed. Also, in PUCCH group 2, a PSCell 514 is a cell in which PUCCH transmission/reception for downlink cells 506, 508, and 510 is performed. For a detailed PUCCH group creation method, refer to section 6.3.2 of 3GPP standard TS38.331, and for a PUCCH information transmission/reception operation method according to the PUCCH group, refer to section 9 of 3GPP standard TS38.213.

Embodiments described below solve problems that may occur between carriers existing in one PUCCH group or in the same PUCCH group. As described above, URLLC is a service that requires high reliability and low latency, and it is an important factor to minimize unnecessary latency time between the base station and the UE. If TDD configuration information of carrier-aggregated cells is different, the base station may allocate resources for transmitting PUCCHs for downlink CCs associated with the same PUCCH group in consideration of configuration information of a slot format indicator (SFI) of the PCell. For example, the PUCCH cannot be transmitted for symbols indicated as downlink by a higher signal or layer 1, (L1, a physical channel) signal in the PCell. Accordingly, there is a possibility that a transmission latency time of the PUCCH is increased. Methods for minimizing such a latency time are described in detail below FIG. 6 is a diagram illustrating a method for transmitting HARQ-ACK information in a situation in which aggregated carriers have different TDD structures.

Figure 6:
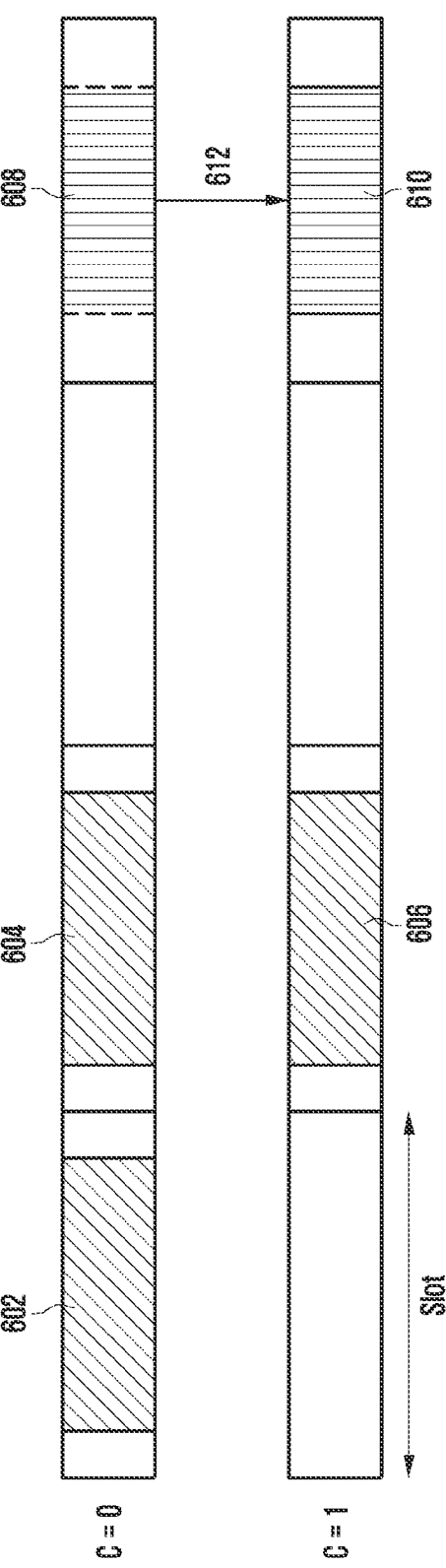
FIG. 6 illustrates a method for transmitting HARQ-ACK information in a situation in which aggregated carriers have different time division duplex (TDD) structures.

FIG. 6 shows a situation in which two carriers are aggregated with each other. A cell having a cell index of 0 (c=0) is a PCell, and a cell having a cell index of 1 (c=1) is an SCell). Because both carriers are TDD, the number of uplink cells and the number of downlink cells are equal to each other as 2. Although a downlink cell index and an uplink cell index are regarded as being equal in this example, they may have different values. For example, the downlink cell index 3 may be associated with an uplink primary cell. In addition, it may configure TDD configuration information for the cell of c=0 and the cell of c=1 to have different directions by SFI.

In FIG. 6, the base station may schedule two PDSCHs 602 and 604 via DCI in the cell of c=0. A resource for transmitting a PUCCH 608 including HARQ-ACK information for the corresponding PDSCH may be determined by a PUCCH resource indicator field and PDSCH-to-HARQ-ACK timing information in DCI. Also, a PUCCH including HARQ-ACK information for a PDSCH 606 scheduled at c=1 is transmitted at 608. Therefore, HARQ-ACK information included in the PUCCH 608 includes demodulation/decoding results for the PDSCHs 602 and 604 of c=0 and the PDSCH 606 of c=1, and the PUCCH including the HARQ-ACK information is transmitted from the UE to the base station through the PUCCH 608 of the primary cell (c=0). However, in case that a part of the resources of the PUCCH 608 is indicated as a downlink symbol by a higher signal or L1 signal, the UE cannot transmit the PUCCH 608 and may perform an arbitrary operation by considering it as an error case. Therefore, in order to prevent this situation from occurring, the base station must ensure that all symbols through which the PUCCH 608 is transmitted become uplink symbols.

In the TDD structure, because there is usually a lot of downlink traffic, the ratio of downlink symbols is higher than that of uplink symbols. Therefore, the base station may schedule so that the UE described in section 5.3 of TS 38.214 of the 3GPP standard can transmit the PUCCH 608 in the first existing uplink symbol as long as it satisfies the minimum processing time required for transmitting HARQ-ACK information for the PDSCH. If some of the resources of the PUCCH 608 are indicated as downlink symbols as in FIG. 6, the corresponding PUCCH may have to be scheduled with a delay in a slot where a subsequent uplink symbol exists. However, as described above, the HARQ-ACK transmission delay in URLLC causes a delay in the retransmission of the PDSCH and thus causes a problem of increasing the latency time for the overall data transmission/reception.

Therefore, if the PUCCH 608 resource can be included in the same slot of the secondary cell other than the primary cell, it may be reasonable in terms of reducing the latency time to transmit the PUCCH to the secondary cell other than the primary cell. For example, by considering the PUCCH 608 of c=0 as the PUCCH 610 of c=1 through an explicit or implicit change scheme 612, the UE may transmit the corresponding PUCCH 610 in c=1. This may be referred to as PUCCH transmission cell switching. Alternatively, this may be referred to as a cell switching-based control information transmission/reception method. In this case, the PUCCH 608 and the PUCCH 610 include the same UCI information, and the PUCCH resource information may be unchanged regardless of the cell index or changed explicitly or implicitly for a changed cell. For example, in case that the PUCCH resource information is unchanged regardless of the cell index, the UE may assume that the same PUCCH transmission is performed based on the lowest RB index based on the activated BWP regardless of the frequency bandwidth size in both c=0 and c=1. In the other case, for example, if the frequency band of c=0 is 100 MHz and the frequency band of c=1 is 10 MHz, frequency resource allocation information, frequency hopping information, PUCCH power allocation information, etc. may be changed. Before the changed information is supported, the base station may provide PUCCH-related configuration information described in section 6.3.2 of 3GPP standard TS 38.331 to the UE in advance for each cell, and the UE may consider and apply the higher level information for the changed cells. In this case, a separate additional DCI field or L1 signal may not be required. Also, a combination of the two schemes may be applied. For example, if different PUCCH configuration information for each cell cannot be configured via a higher signal, the UE may regard the PUCCH configuration information for each cell as the same and follow the above-described method. On the other hand, if different PUCCH configuration information for each cell is configured via a higher signal, the may perform PUCCH transmission in consideration of PUCCH higher signal configuration information related to the cell according to the changed cell index.

Therefore, in the existing Rel-15 NR, indicating a PUCCH resource by another DCI in a resource indicated as a downlink symbol was regarded as an error case, but in case that respective carriers have different TDD configuration information in the carrier aggregation described above in FIG. 6, the error case may no longer be an error case. At least one of the followings or a combination thereof may be applied as a method for supporting PUCCH transmission cell switching.

Method 6-1: Implicit Method 1 (Change a Cell Index to Transmit PUCCH by a Specific Scheme)

This method is transmitting PUCCH information for valid uplink symbols based on slot format information previously configured for each cell without a separate L1 signaling indication. Basically, when a PUCCH resource finally indicated by DCI is valid in the primary cell, the UE may transmit the PUCCH resource in the primary cell. On the other hand, if a PUCCH resource finally indicated by DCI is not valid in the primary cell, the UE may transmit the PUCCH resource in a secondary cell having the earliest order among orders determined by at least one of the following detailed methods among secondary cells in which PUCCH resource transmission is valid. That PUCCH resource transmission is valid may mean that at least a part of the symbols of the indicated PUCCH resource is not configured or indicated as a downlink symbol. That PUCCH resource transmission is not valid may mean that at least a part of the symbols of the indicated PUCCH resource is configured or indicated as a downlink symbol. Here, the cell index may be a cell index in view of a logical channel or a cell index in view of a physical channel.

Detailed Method 6-1-1: When the primary cell index is c=i, a cell to transmit the PUCCH is determined in ascending order (c=0→1→2→ . . . ) or in descending order (c=k k-1→k-2→ . . . ) of the remaining cell indices except for c=i among the secondary cells. Here, k denotes the total number of cells in which the PUCCH can be transmitted in a carrier aggregation situation, the total number of uplink transmission cells, or a value configure by the base station. For example, if PUCCH resource transmission of cells having cell indices 0, 1, and 2 among secondary cells is valid, and if cells are determined in ascending order, the PUCCH is transmitted and received in the secondary cell corresponding to c=0. Alternatively, if cells are determined in descending order, the PUCCH is transmitted and received in the secondary cell corresponding to c=2.

Detailed Method 6-1-2: When the primary cell index is c=i, a cell to transmit the PUCCH is determined in ascending order or in descending order of the remaining cell indices except for c=i among the secondary cells. A difference from the detailed method 6-1-1 is that the ascending or descending order is determined based on the primary cell index. For example, in case of ascending order, determination is made in the order of c=mod(i+1, k)→c=mod(i+2, k)→c=mod(i+3, k)→ . . . , and in case of descending order, determination is made in the order of c=mod(i−1 k)→c=mod(i−2, k)→c=mod(i−3, k)→ . . . .

According to method 6-1, the UE may implicitly select a cell to transmit the PUCCH. If both the primary cell and the secondary cell in one PUCCH group are not valid cells capable of transmitting the PUCCH resource, the UE may regard it as an error case and perform an arbitrary operation, Method 6-2: Explicit Method (Select a PUCCH Transmission Cell Index)

This method is explicitly indicating, via a DCI field or L1 signaling, a cell index for transmission of PUCCH including UCI information, similar to cross-carrier scheduling in which a cell for PDCCH transmission/reception and a cell for PDSCH/PUSCH transmission/reception are different. The following detailed methods may be considered, and at least one of them may be used.

Detailed Method 6-2-1: An additional field such as a carrier indication field (CIF) may be included in the DCI. When a bit field is n bits, the UE may indicate a total of $2^n$ cell indexes. The base station may inform in advance which uplink cell index is associated with each corresponding value via a higher signal. in this case, the first value may be always the primary cell.

Detailed Method 6-2-2: A PUCCH resource indicator value, which is a field of DCI indicating a PUCCH resource, may indicate information associated with a specific cell index via a higher signal in advance. If the corresponding higher signal value is not configured, the UE may determine that it is PUCCH resource information associated with the primary cell. Specifically, the PUCCH resource indicator may indicate higher signal configuration information including PUCCH format, time/frequency resource information, frequency hopping information, and the like. This higher signal configuration information may further include cell index information for transmitting PUCCH.

Detailed Method 6-2-3: A cell for PUCCH transmission may be associated with a CORESET or search space index. Specifically, in higher signal configuration information related to CORESET or search space, a cell index for transmission of PUCCH for detected DCI may be configured in advance. If the higher signal configuration information is not included in a higher signal related to CORESET or search space in advance, the UE may determine that PUCCH information is transmitted in the primary cell.

Detailed Method 6-2-4: A cell for PUCCH transmission may be determined based on RNTI or any other RRC configuration information (e.g., sub-slot configuration, HARQ-ACK codebook index, processing time, etc.). When the cell for PUCCH transmission is determined based on the RNTI, the UE may interpret that the PUCCH is transmitted in the primary cell in the case of RNTI A and in one of the secondary cells previously configured via a higher signal in the case of RNTI B. In addition, the cell index for PUCCH transmission may be determined based on sub-slot configuration that is an RRC parameter indicating the PDSCH-to-HARQ-ACK feedback timing in a sub-slot unit smaller than 14 symbols rather than in a slot unit. Similarly, the cell index for PUCCH transmission may be determined based on the HARQ-ACK codebook index value or processing time capability determined in a higher signal or L1 signal.

Method 6-3: Implicit Method 2 (PUCCH Transmission Cell Index is Preselected)

This method is a method in which a cell for PUCCH transmission is transmitted in a cell other than the PCell in the corresponding cell group without a specific L1 signal as in method 6-1. Specifically, a cell in which the corresponding PUCCH is transmitted may be assigned to the UE in advance through a signal such as RRC or MAC CE. For example, the PUCCH for control and data information transmitted and received in cell A may be designated to be transmitted to cell B by at least one of the above signals or a combination thereof. If there is no separate signal, the UE may determine that the corresponding PUCCH is transmitted in cell A.

Alternatively, a cell in which the PUCCH can be transmitted may be configured for each frame index through the higher signals. For example, the UE may transmit the PUCCH in cell A in the even-numbered slot index, and transmit the PUCCH in the cell B in the odd-numbered slot index. The index may be a physical channel reference index or a logical channel reference index. Although the above description is based on the frame length, it may be replaced with terms such as a subframe or a slot, which are other time units than the frame.

When each cell capable of cell switching has different subcarrier spacing (SCS), the UE may configure a unit for cell switching based on the SCS of the PCell or SCell. For example, when the SCS of the PCell is 15 kHz and the SCS of the SCell is 30 kHz, the unit of whether or not the cell switching indicator is indicated in one slot of the PCell may be regarded as indicated over two slots in the SCell. On the other hand, when the SCS of the PCell is 30 kHz and the SCS of the SCell is 15 kHz, one slot of the PCell corresponds to half the slot length of the SCell, and when a cell for PUCCH transmission is indicated for each PCell slot, cell switching for PUCCH transmission may occur in the middle of the slot in the SCell. Therefore, in order to prevent such a situation, the base station may configure at least not to cause cell switching within the slot of the SCell. If the base station configures the cell switching for PUCCH transmission to occur in the middle of the slot in the SCell, the LTE may regard it as an error case and perform an arbitrary operation.

In addition, the indicator for PUCCH cell switching may be applied by 1 bit in units of each slot or group of slots. For example, if cell switching for PUCCH transmission is possible in up to two cells in a situation in which a cell for PUCCH transmission based on 15 kHz PCell is indicated in units of 10 ms, the cell switching may be indicated as 11000001111 with a total of 10 bitmap information, and each bitmap order may refer to a slot index within 10 ms, wherein 1 may refer to SCell, and 0 may refer to PCell. Therefore, according to the bitmap information, a higher signal may be configured so that the PUCCH is transmitted in the SCell in the cases of 1, 2, 7, 8, 9, and 10th slots within 10 ms, and the PUCCH is transmitted in the PCell in the cases of 3, 4, 5, and 6th slots. The bitmap may be repeatedly applied with a period of 10 ms. The above description is only an example, and it is possible to apply a value other than 10 ms, and also to interchangeably apply the values of 1 and 0.

Figure 7:
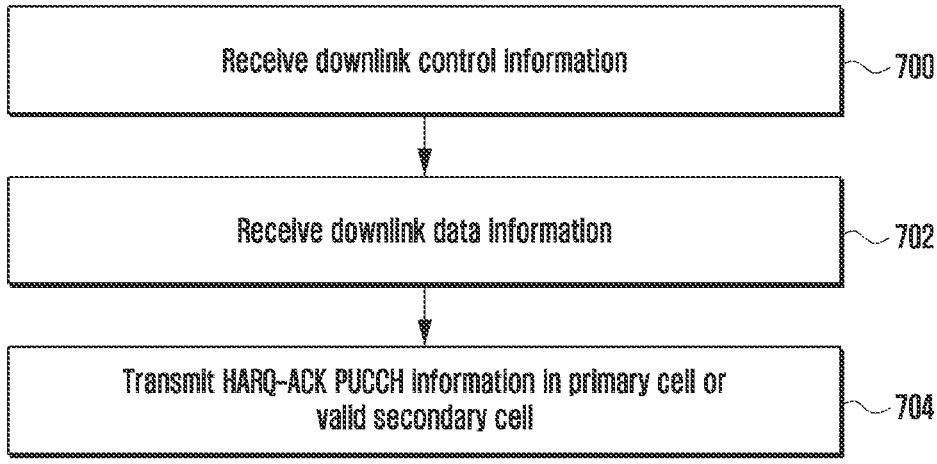
FIG. 7 is a flowchart illustrating an operation of a UE for transmitting HARQ-ACK information in a situation in which aggregated carriers have different TDD structures.

FIG. 7 is a flow diagram illustrating an operation of a UE for transmitting HARQ-ACK information in a situation in which aggregated carriers have different TDD structures.

As described above, in a situation in which the UE supports and is configured with carrier aggregation, at 700 the UE may receive downlink control information from the base station in a downlink control channel configured from one cell or several cells. At 702, depending on information indicated by the downlink control information, the UE may receive downlink data information in a self-carrier scheduling scheme or a cross-carrier scheduling scheme. The self-carrier scheduling is a scheduling scheme in which downlink control information and data information are transmitted/received in the same cell, and the cross-carrier scheduling is a scheduling scheme in which downlink control information and data information are transmitted/received in different cells. At 704, in response to receiving the downlink data information, the UE may transmit a PUCCH including HARQ-ACK information to the base station in a specific cell. For example, based on at least one of the methods described above in FIG. 6, the UE may determine a primary cell or a valid secondary cell and transmit the PUCCH including the HARQ-ACK information to the base station through the determined cell.

FIG. 8 is a diagram illustrating a situation in which an uplink control channel and data channel having different priorities overlap with each other in view of time resources in one cell.

In FIG. 8, when the UE may report the UE capability for simultaneous PUCCH and PUSCH transmission in one cell, and when the base station configures the simultaneous PUCCH and PUSCH transmission to the UE, the UE may perform the simultaneous PUCCH and PUSCH transmission. In addition, the priority of the PUCCH and the PUSCH may be determined via a higher level signal or an L1 signal. For example, in the L1 signal, based on DCI field information, RNTI, DCI format information, and DCI-detected CORESET/search space, it may be determined whether the PUCCH is a PUCCH having a high priority (e.g., URLLC PUCCH) or a PUCCH having a low priority (e.g., eMBB PUCCH), and whether the PUSCH is a PUSCH having a high priority (e.g., URLLC PUSCH) or a PUSCH having a low priority (e.g., eMBB PUSCH). Although in FIG. 8 two steps of priority are expressed, it can be sufficiently applied to a case having more step values.

As shown in FIG. 8, eMBB PUCCH 800, eMMB PUSCH 802, and URLLC PUSCH 804 may be scheduled by the base station. When multiplexing is possible only for PUCCH and PUSCH having the same priority, the UE will transmit UCI information contained in the eMBB PUCCH by including it in the eMBB PUSCH 802. However, because the UE does not support simultaneous transmission of the eMBB PUSCH and the URLLC PUSCH, the UE should not include the UCI information contained in the eMBB PUCCH in the eMBB PUSCH. Therefore, the UE drops the eMBB PUSCH 802 and performs simultaneous transmission of the eMBB PUCCH 800 and the URLLC PUSCH 804.

Alternatively, when the UE is capable of simultaneous PUSCH and PUCCH transmission in one cell, the UE may determine whether PUSCHs overlap with each other and PUCCHs overlap with each other in view of time resources among all PUSCHs and PUCCHs received from the base station. For example, FIG. 8 shows a situation in which eMBB PUCCH 806, eMBB PUSCH 808, URLLC PUSCH 810, and URLLC PUCCH 812 overlap within at least one symbol in view of time resources. In such a situation, the UE may support at least one of the following two methods.

Method 8-1: This is a method of performing a drop operation according to priority for each PUSCH/ PUCCH and then finally transmitting only one PUSCH and one PUCCH. For example, when the overlapping situation shown in FIG. 8 occurs, the UE may transmit the URLLC PUCCH 812 while dropping the eMBB PUCCH 806 in view of PUCCH, and transmit the URLLC PUSCH 810 while dropping the eMBB PUSCH 808 in view of PUSCH. The advantage of this method is that the UE does not need to additionally consider whether PUSCH and PUCCH are multiplexed.

Method 8-2: In the method 8-1, eMBB PUCCH is dropped. If HARQ-ACK feedback information is included in eMBB PUCCH information, the base station has no choice but to perform retransmission of all PDSCHs related to HARQ-ACK information. In order to solve this problem, a method of supporting multiplexing for PUCCH/PUSCH with a higher priority and transmitting PUCCH with a lower priority may be considered. For example, in FIG. 8, UCI information included in the URLLC PUCCH 812 is included in the URLLC PUSCH 810 and transmitted, and the eMBB PUCCH 806 is transmitted. Also, the eMBB PUSCH 808 having a lower priority than that of the URLLC PUSCH 810 is dropped. Therefore, the method 8-2 has an advantage in that the number of dropped channels is reduced compared to the method 8-1.

Method 8-3: This method is similar to the method 8-1, but the eMBB PUCCH 806 may be transmitted via another cell. Because the eMBB PUCCH 806 cannot be transmitted in the situation of FIG. 8 as in the method described in FIG. 6, if the UE supports carrier aggregation, the UE may transmit the eMBB PUCCH 806 in the secondary cell other than the primary cell.

The PUCCH/PUSCH described in FIG. 8 may be a resource scheduled by DCI or resources configured via a higher signal in advance.

Figure 9:
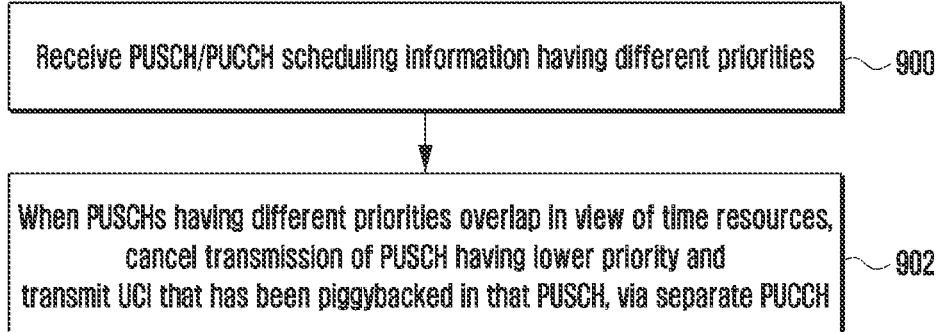
FIG. 9 is a flowchart illustrating an operation of a UE when an uplink control channel and data channel having different priorities overlap with each other in view of time resources in one cell.

FIG. 9 is a flowchart illustrating an operation of a UE when an uplink control channel and data channel having different priorities overlap with each other in view of time resources in one cell.

At 900, the UE may receive PUSCH/PUCCH scheduling information having different priorities. When PUSCHs having different priorities overlap in view of time resources, at 902 the UE may cancel transmission of a PUSCH having a lower priority and transmit UCI that has been piggybacked in that PUSCH, via a separate PUCCH. Alternatively, based on the methods described above in FIG. 8, for PUCCHs or PUSCHs having different priorities, the UE may drop some PUCCHs or PUSCHs through a drop or multiplexing scheme. The UE may transmit the other PUCCHs or PUSCHs that are not dropped to the base station.

Figure 10:
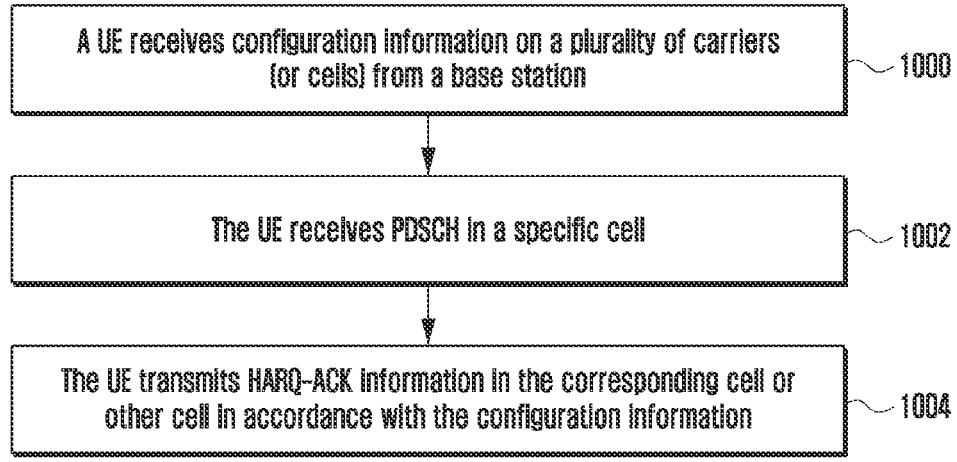
FIG. 10 is a flowchart illustrating an HARQ-ACK reporting operation of a UE in response to downlink data reception, according to an embodiment.

FIG. 10 is a flowchart illustrating an HARQ-ACK reporting operation of a UE in response to downlink data reception, according to an embodiment.

The UE may be configured for one or more carriers through a higher signal, and Table 7 shows an example of the higher signal.

TABLE 7

```
PDSCH-ServingCellConfig ::=          SEQUENCE codeBlockGroupTransmission
SetupRelease { PDSCH-CodeBlockGroupTransmission } OPTIONAL,      -- Need M:
Configuration information indicating whether retransmission in units of code blocks is
supported
xOverhead  ENUMERATED { xOh6, xOh12, xOh18 }   OPTIONAL,      -- Need S:
Xoverhead configuration information for TBS calculation
nrofHARQ-ProcessesForPDSCH      ENUMERATED {n2, n4, n6, n10, n12, n16}
OPTIONAL,      -- Need S :
Configuration information of the total number of HARQ-ACK processes
pucch-Cell                        ServCellIndex
OPTIONAL,      -- Cond SCellAddOnly :
Configuration information that is applied only to a secondary cell and specifies a cell index
in which PUCCH including HARQ-ACK information for PDSCH is transmitted
dynamic-carrier-selection-for-PUCCH   ENUMERATED {enable, disable} OPTIONAL :
Configuration information for determining whether to dynamically select a cell for
```

TABLE 7-continued

```
transmitting HARQ-ACK PUCCH
...,
[[
maxMIMO-Layers                    INTEGER (1..8)
OPTIONAL,   -- Need M:
Configuration information of the maximum number of MIMO layers
processingType2Enabled            BOOLEAN
OPTIONAL      -- Need M:
Configuration information of processing capability 2
   ]],
}
```

Table 7 shows the types of higher signals that can be configured for each UE. Among them, when the UE is configured to receive PDSCH in an SCell rather than a PCell, ServCellIndex for transmitting PUCCH including HARQ-ACK information for the corresponding PDSCH may be separately configured, as shown in Table 7. One ServCellIndex is configured for each PUCCH group cell. In this case, a ServCellIndex value may be a primary cell or another cell index value. This may be determined by UE capability.

For example, when the UE can transmit PUCCH or simultaneously through a plurality of cells, a cell index value other than the primary cell may be configured for ServCellIndex in Table 7. For example, for two PDSCH receiving cells, PUCCH may be transmitted with different cell index values. In another example, when the UE even configured with a plurality of cells can transmit PUCCH or PUSCH through one cell, the primary cell or the same cell index value may be configured for ServCellIndex in Table 7. For example, for two PDSCH receiving cells, the UE may transmit PUCCH with the same cell index value. In still another example, although the UE cannot simultaneously transmit PUCCH or PUSCH through a plurality of cells, a plurality of cell indices for a PUCCH-Cell may be configured for one PDSCH cell in Table 7. As described above in FIGS. 6 and 7, for PUCCH transmission (PUCCH-Cell) including HARQ-ACK information for scheduled PDSCH, one value among a plurality of cell indices rather than one cell index value configured via a higher signal in advance may be selected through the L1 signal. In yet another example, higher signal information other than the higher signal described above in Table 7 may be added, so that whether the PUCCH-Cell information can configure one or a plurality of cell indices may be indicated to the UE. In further another example, there may be a higher signal parameter capable of dynamically selecting a carrier for transmitting HARQ-ACK PUCCH, such as dynamic-carrier-selection-for-PUCCH in Table 7. When the higher signal parameter is disabled, a cell transmitting one common HARQ-ACK PUCCH may be fixed for the UE, and a cell index for a PUCCH-Cell may be fixed to a single value. Alternatively, when the higher signal parameter is enabled, the UE may be configured through a PUCCH-Cell or other serving cell information that transmits a plurality of HARQ-ACK PUCCHs, and a cell index in which HARQ-ACK PUCCH is dynamically transmitted through FIGS. 6 and 7 may be indicated.

After receiving the higher signal, the UE may determine a cell index through which PUCCH including HARQ-ACK information for the received PDSCH is transmitted/received. The PDSCH may correspond to at least one of PDSCH scheduled with DCI, PDSCH (e.g., SPS PDSCH) scheduled without DCI, PDSCH (e.g., URLLC PDSCH) with high priority by priority information, or PDSCH (e.g., eMBB PDSCH or MTC PDSCH) with low priority by priority information. The cell index through which the PUCCH including the HARQ-ACK information is transmitted/received may be fixed to one cell index or may have a plurality of cell indices. As described above in FIGS. 6 and 7, the UE may explicitly or implicitly select a specific cell index, or regardless of this, always transmit the PUCCH including the HARQ-ACK information with one cell index configured by a higher signal. At least one of these methods may be applied by the UE, and may be notified by a higher signal or an L1 signal.

Figure 11:
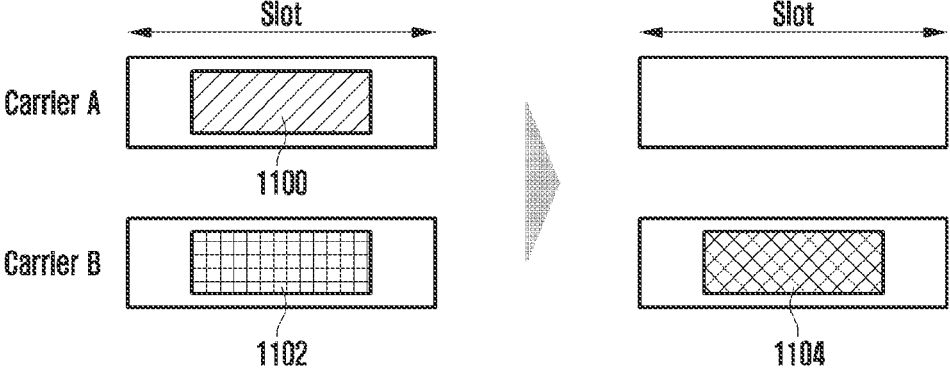
FIG. 11 illustrates overlapping of a plurality of channels in a situation in which carriers are aggregated, according to an embodiment.
Figure 12:
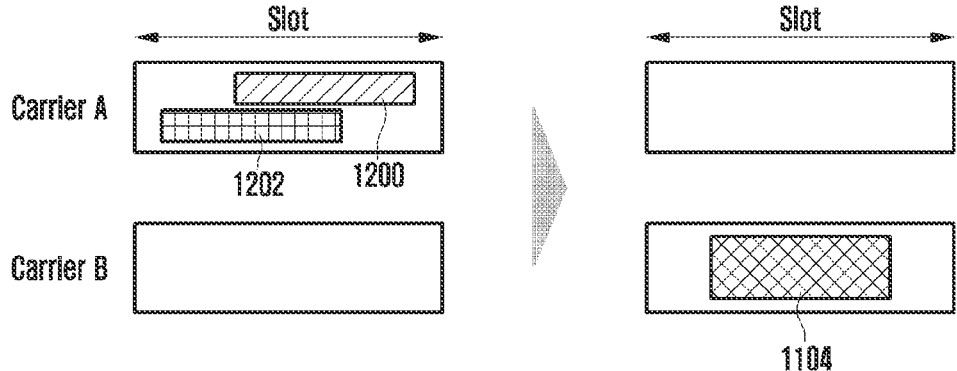
FIG. 12 illustrates overlapping of a plurality of channels in a situation in which carriers are aggregated, according to an embodiment.
Figure 13:
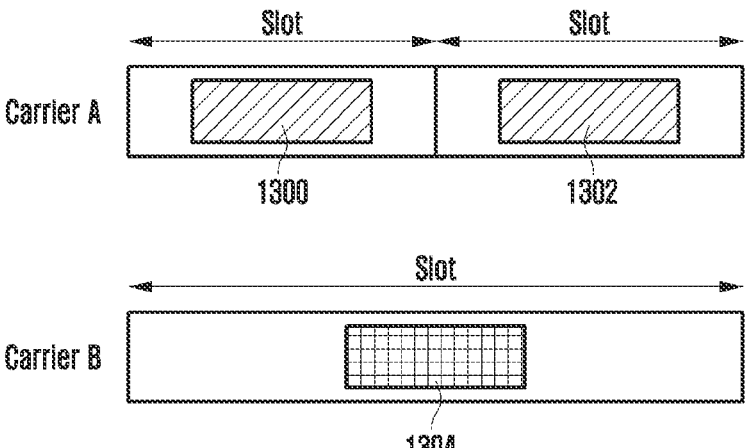
FIG. 13 illustrates overlapping of a plurality of channels in a situation in which carriers are aggregated, according to an embodiment.
Figure 14:
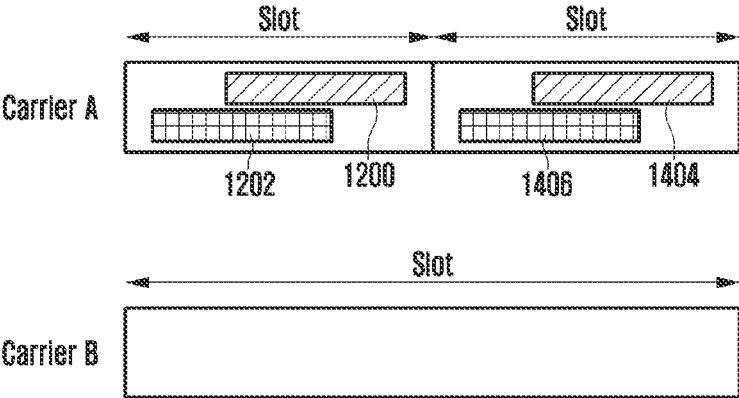
FIG. 14 illustrates overlapping of a plurality of channels in a situation in which carriers are aggregated, according to an embodiment.
Figure 15:
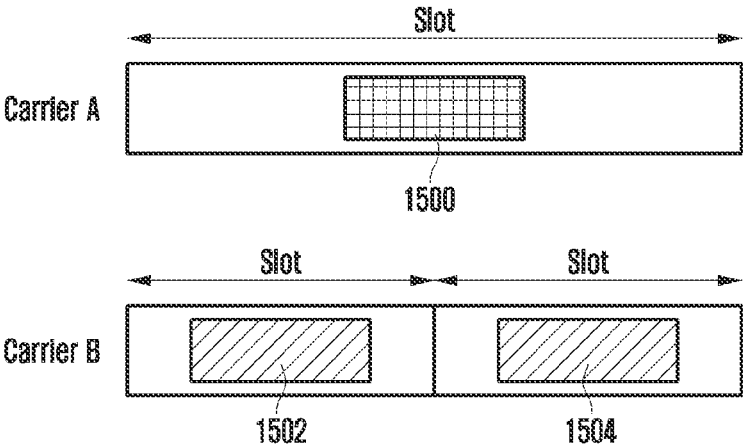
FIG. 15 illustrates overlapping of a plurality of channels in a situation in which carriers are aggregated, according to an embodiment.
Figure 16:
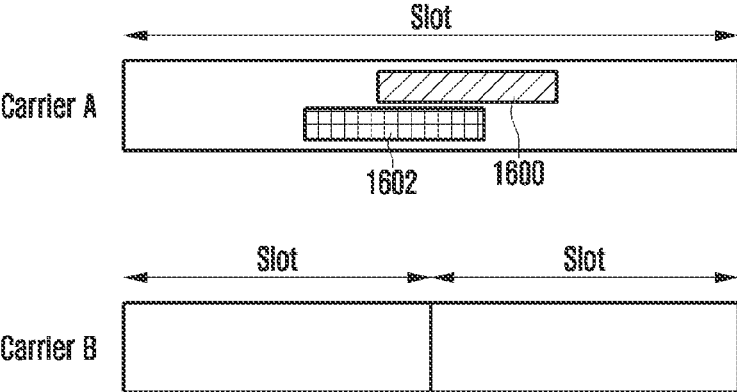
FIG. 16 illustrates overlapping of a plurality of channels in a situation in which carriers are aggregated, according to an embodiment.

In the following embodiment, when a plurality of PUCCHs are overlapped in terms of time resources in a case in which the UE can transmit a PUCCH including control information to a cell other than the PCell in a situation in which a plurality of carriers are aggregated, a method for multiplexing them and transmitting them with one PUCCH at the UE will be described. Control information is divided into UCI and DCI. The UCI refers to control information included in PUCCH, and the DCI refers to control information included in PDCCH. Data information is divided into uplink data information and downlink data information. The uplink data information refers to data information included in PUSCH, and the downlink data information refers to data information included in PDSCH. When two PUCCHs overlap at a specific time, the UE may generate one control information by multiplexing control information of the corresponding overlapping PUCCHs and transmit the control information by selecting one of the two PUCCHs or transmit the control information by allocating it to a third PUCCH resource. The third PUCCH resource may be determined based on a control information size, PUCCH configuration information, and the like. FIGS. 11, 13, and 15 assume a situation in which the UE explicitly determines a carrier for transmitting the PUCCH according to the method 6-2 described with respect to FIG. 6. FIGS. 12, 14, and 16 assume a situation in which the UE implicitly determines a carrier for transmitting the PUCCH according to the method 6-1 or 6-3 described with respect to FIG. 6.

FIG. 11 is a diagram illustrating overlapping of a plurality of channels in a situation in which carriers are aggregated, according to an embodiment.

FIG. 11 illustrates a situation in which even if PUCCHs 1100 and 1102 to which uplink control information including at least some of HARQ, SR, or CSI information is allocated for each carrier are allocated to different carriers, they overlap from the viewpoint of time resources. Each of the corresponding PUCCHs may be a resource indicated by DCI or a resource indicated by higher layer signaling such as RRC or MAC CE. For example, if Carrier A is the PCell and Carrier B is the SCell, and if the UE can transmit only one PUCCH at a specific moment in one cell group, the PUCCH 1100 and the PUCCH 1102 may be in the following cases.

Case 11-1 (where the PUCCH 1100 is a resource configured by higher layer signaling such as RRC or MAC CE, and the PUCCH 1102 is a resource indicated by DCI): For example, the PUCCH 1100 may be a resource configured by RRC or MAC CE to periodically transmit and receive CSI information or SR information, and the PUCCH 1102 may be a resource indicated for the purpose of sending HARQ-ACK information by control information received by the UE in the PCell or the SCell. Because the UE can transmit only one PUCCH at a time per one cell group, even in the case of different cells, the UE should multiplex the uplink control information included in two PUCCHs in which at least one symbol overlaps from the viewpoint of time resources or which overlap within the same slot interval, and then transmit it as one PUCCH. Therefore, as shown for example in FIG. 11, after multiplexing the uplink control information in the SCell indicated by the downlink control information, the UE may transmit the PUCCH 1104 newly determined. In another example, the UE may drop the PUCCH 1100 and transmit the PUCCH 1102 indicated by the downlink control information. For example, without allowing multiplexing between overlapping PUCCHs, the UE may transmit the PUCCH indicated in the L1 signal with priority.

Case 11-2 (where both the PUCCH 1100 and the PUCCH 1102 are resources configured by higher layer signaling such as RRC or MAC CE): For example, the PUCCH 1100 may be a resource configured by RRC or MAC CE to periodically transmit and receive CSI information or SR information, and the PUCCH 1102 may be a resource indicated for the purpose of transmitting HARQ-ACK information for a SPS PDSCH periodically received by the UE in the PCell or the SCell. In the case 11-2, because the two PUCCH resources are resources indicated by respective higher layer signals, it may be difficult to prioritize a specific resource based on the signal indicating the PUCCH resource as in the case UCI. Therefore, in the case 11-2, a carrier for transmitting the PUCCH may be selected according to UCI information type included in the PUCCH. In the above example, when the PUCCH 1102 transmits HARQ-ACK information and the PUCCH 1100 transmits CSI information or SR information, the UE may give priority to the carrier in which the PUCCH 1102 is configured, and multiplex CSI information or SR information included in the PUCCH 1100 with HARQ-ACK to transmit it with the updated PUCCH 1104. Alternatively, the UE may drop the PUCCH 1100 and transmit only the PUCCH 1102. This may be limitedly applied when two pieces of PUCCH 1100 information are of the same type.

Case 11-3 (where the PUCCH 1100 and the PUCCH 1102 are resources configured by DCI): The case 11-3 may correspond to a case where both the PUCCH 1100 and the PUCCH 1102 are resources including HARQ-ACK information indicated by DCI. The UE may select a cell including a PUCCH resource scheduled by DCI later among the PUCCHs. For example, when the PUCCH 1102 is scheduled later by DCI, the UE may multiplex the HARQ-ACK information included in the PUCCH 1100 and the PUCCH 1102 and then transmit it to the base station through the PUCCH 1104. Alternatively, because control information included in both PUCCHs is of the same type, the UE may transmit only the latest scheduled PUCCH and drop PUCCHs overlapping therewith. Alternatively, the PUCCH may be always transmitted in a fixed PCell or a previously configured SCell regardless of a time when the PUCCH is scheduled.

With respect to the above-described embodiments, the UE may transmit the PUCCH after multiplexing all of the UCIs included in overlapping PUCCHs, may multiplex and transmit only the UCIs in selected PUCCHs, or may transmit the PUCCH after multiplexing only overlapping PUCCHs existing in a selected cell. For example, the UE may select a cell in which the PUCCH is transmitted in consideration of at least one of the following or a combination thereof and transmit the PUCCH within the selected cell.

Validity or not of a configured PUCCH resource: Whether the corresponding PUCCH resource is indicated as uplink symbols (or flexible symbols) by TDD configuration. When at least one symbol is configured or indicated as a downlink symbol, the corresponding PUCCH resource may be determined to be invalid. Otherwise, it may be determined to be valid.

Cell type for PUCCH transmission: A cell index in which the corresponding PUCCH is transmitted, and index information of PCell, SCell, or cell.

Control information included in PUCCH: A combination of at least one of control information included in PUCCH, and the control information may be CSI, SR, or HARQ-ACK.

PUCCH resource size: The size of a time or frequency resource to which PUCCH is allocated. Alternatively, a start symbol or an end symbol in a time resource of PUCCH.

PUCCH format: A modulation/demodulation technique for generating a specific PUCCH format, and PUCCH formats 1, 2, 3, 4 and 5 based on 5G NR.

PUCCH resource configured type: By which signal the corresponding PUCCH resource is allocated, and a type configured by DCI, MAC CE, or RRC.

Repeated transmission or not of PUCCH: Whether the corresponding PUCCH resource is a part of repeatedly transmitted PUCCH resources.

FIG. 12 is a diagram illustrating overlapping of a plurality of channels in a situation in which carriers are aggregated, according to an embodiment.

FIG. 12 shows that basically all PUCCH resources are allocated in Carrier A, which is a PCell, and then, when a determined PUCCH resource cannot be transmitted in the PCell, the UE may transmit the corresponding PUCCH in Carrier B instead of the PCell. Not being transmitted in the PCell means, for example, in a situation in which a PUCCH 1200 and a PUCCH 1202 overlap, at least one symbol in a PUCCH resources determined after multiplexing control information included in the corresponding PUCCHs is not an uplink symbol (or flexible symbol). In this case, the UE cannot transmit the corresponding PUCCH. Therefore, the UE may transmit the PUCCH in the SCell rather than the PCell. FIG. 12 shows that Carrier B is selected and a PUCCH 1204 is transmitted in the corresponding Carrier B. This is similar to method 6-1 described above with reference to FIG. 6.

FIG. 13 is a diagram illustrating overlapping of a plurality of channels in a situation in which carriers are aggregated, according to an embodiment.

In FIG. 13, unlike FIGS. 11 and 12, a case in which carriers have different subcarrier spacings is illustrated. For example, a case in which Carrier A has a greater subcarrier spacing than Carrier B is considered.

With reference to FIG. 13, a PUCCH 1300 and a PUCCH 1302 may be CSI or SR resources configured by higher layer signaling, and a PUCCH 1304 may be a HARQ-ACK information resource indicated by DCI. In a situation in which the UE transmits the PUCCH 1304, whether to multiplex with the PUCCH 1304 may be determined according to control information types included in the PUCCH 1300 and the PUCCH 1302 or a slot position including each PUCCH. For example, a PUCCH resource determined after multiplexing only one of the PUCCH 1300 or the PUCCH 1302 with the PUCCH 1304 may be transmitted in Carrier B. For example, the PUCCH 1300 located in the first existing slot among the overlapping slots from the viewpoint of slot may be multiplexed with the PUCCH 1304. Alternatively, the PUCCH 1302 located in the latest slot may be multiplexed with the PUCCH 1304. Alternatively, when one slot of Carrier B overlaps with several slots of Carrier A, the PUCCH in the first slot or the latest slot may be multiplexed with the PUCCH of Carrier B regardless of whether PUCCH of Carrier A is allocated. Therefore, when there is no PUCCH in the corresponding slot of Carrier A, the UE may transmit the PUCCH of Carrier B without multiplexing. Alternatively, when one slot of Carrier B overlaps with several slots of Carrier A, depending on whether PUCCH is allocated to Carrier A, the PUCCH in the first slot or the latest slot among the slots in which the PUCCH exists may be multiplexed with the PUCCH of Carrier B. Alternatively, in the case of FIG. 13, the UE may transmit only the PUCCH allocated to a specific carrier without multiplexing unlike in FIG. 11. For example, depending on whether subcarrier spacings of carriers to which overlapping PUCCH resources belong are the same or different, when subcarrier spacings are the same, multiplexing of PUCCHs is performed, and when subcarrier spacings are different, multiplexing of PUCCHs is not performed while only one PUCCH is selected and transmitted and the other PUCCHs are dropped.

FIG. 14 is a diagram illustrating overlapping of a plurality of channels in a situation in which carriers are aggregated, according to an embodiment.

FIG. 14 illustrates a situation in which all resource allocation of PUCCH is possible only in the PCell although carriers have different subcarrier spacings. In addition, although FIG. 14 illustrates a situation in which a plurality of PUCCHs overlap within one carrier, a situation in which only one PUCCH is allocated without overlapping PUCCHs may also be applied.

FIG. 14 illustrates a situation in which the subcarrier spacing of the PCell (Carrier A) has a larger value than the SCell (Carrier B). The UE may multiplex PUCCHs 1400, 1402, 1404, and 1406 in each slot of the PCell, and then determine the PUCCH to be transmitted. If the determined PUCCH resources are not valid in all slots, the UE may have to transmit the PUCCH in carrier B. However, because two slots of the PCell overlap with one slot of the SCell as shown in FIG. 14, the UE may have to select a PUCCH and transmit it through Carrier B. Therefore, the UE may select the PUCCH in consideration of at least one of the followings or a combination thereof.

Transmit information of PUCCH in the first slot of PCell through SCell

Transmit information of PUCCH in the last slot of PCell through SCell

Preferentially transmit at least one PUCCH scheduled in PCell by DCI through SCell Preferentially transmit PUCCH including specific control information in PCell through SCell, wherein the specific control information may be at least one of SR, CSI, or HARQ-ACK Select PUCCH with a higher priority in PCell and transmit it through SCell, wherein information on such a priority may be determined by a higher layer signal or an L1 signal.

FIG. 15 is a diagram illustrating overlapping of a plurality of channels in a situation in which carriers are aggregated, according to an embodiment.

In FIG. 15, unlike FIG. 13, a situation in which several slots of Carrier B overlap with one slot of Carrier A is illustrated. When Carrier B is SCell and Carrier A is PCell, PUCCH resources are configured by higher layer signaling in the PCell, but PUCCH cannot be transmitted in the corresponding resources according to TDD configuration information. In the SCell, PUCCH may be transmitted with a PUCCH resource. As described above, a possible method may drop all PUCCHs of the PCell and transmit only the PUCCH of the SCell. Alternatively, in the case of FIG. 13, only control information of PUCCH in a specific slot among the PUCCHs of the PCell may be multiplexed with control information of PUCCH of the SCell and transmitted in the SCell. In the case of FIG. 15, control information included in PUCCH of the PCell may be multiplexed with control information of PUCCH in a specific slot of the SCell, and the PUCCH in the specific slot of the corresponding SCell may be transmitted. Alternatively, control information of the PCell may be multiplexed within PUCCH to be transmitted in all overlapping slots of the SCell, and the PUCCH may be transmitted in each slot within the SCell. The specific slot may be the first slot, the last slot, or a slot configured by higher layer signaling among the overlapping slots. The definition of the overlapping slot may be determined by slot-by-slot overlap regardless of whether the PUCCH resource is present, or determined by being limited to slots in which the PUCCH resource is present. In addition, multiplexing may be possible only when the types of UCI information of the overlapping PUCCHs are different. Therefore, when the same UCI information is included, the PUCCH of the PCell may be dropped without being multiplexed with the PUCCH of the SCell.

FIG. 16 is a diagram illustrating overlapping of a plurality of channels in a situation in which carriers are aggregated, according to an embodiment.

In FIG. 16, although carriers have different subcarrier spacings, PUCCH resource allocation is possible only in the PCell. In addition, although FIG. 16 illustrates a situation in which a plurality of PUCCHs overlap within one carrier, a situation in which only one PUCCH is allocated without overlapping PUCCHs may also be applied. FIG. 16 shows a situation in which the subcarrier spacing of the PCell (Carrier A) has a value smaller than the SCell (Carrier B). After the UE multiplexes PUCCHs 1600 and 1602 in each slot in the PCell, if the PUCCH cannot be transmitted in the PCell, the UE may have to transmit the PUCCH in the SCell. As shown in FIG. 16, because one slot of the PCell overlaps with two slots of the SCell, the PUCCH may be transmitted in at least one of the two slots. In this case, at least one of the following methods or a combination thereof is possible.

Transmit PUCCH in the first slot of the SCell among slots overlapping with the slot of the PCell Transmit PUCCH in the last slot of the SCell among slots overlapping with the slot of the PCell In consideration of a processing time for PUCCH multiplexing, the overlapping slots may be determined among slots overlapping with the slot of the PCell by limiting the slots that satisfy the processing time. For example, when the PUCCHs 1600 and 1602 are multiplexed in the latter half of the slot in the PCell, the UE cannot transmit the PUCCH in the PCell and thus transmits it in the SCell. However, it may be difficult to transmit it in the first slot in the SCell due to processing time constraints. Accordingly, in this case, the UE may transmit the PUCCH in the second slot in the SCell.

Figure 17:
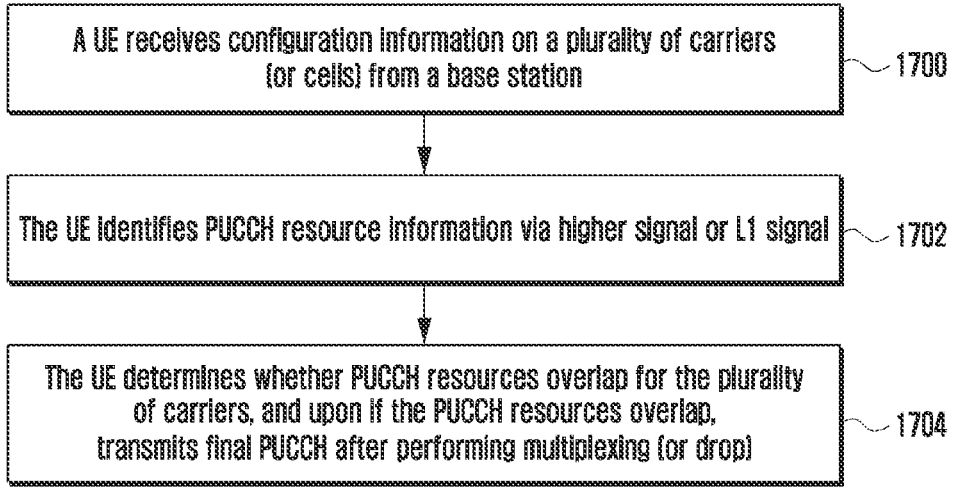
FIG. 17 is a flowchart illustrating a PUCCH transmission method of a UE operating in aggregation of a plurality of carriers.

FIG. 17 is a flowchart illustrating a PUCCH transmission method of a UE operating in aggregation of a plurality of carriers.

After configured with a plurality of carriers from the base station, the UE may receive, from the base station, information indicating that PUCCH can be transmitted in SCell other than PCell. This information may be configured to the UE by limiting the UE capability for transmitting the PUCCH in the SCell. The UE without the corresponding capability may transmit the PUCCH only in the PCell within one cell group. The UE may have one or more cell groups, and when the UE is configured with two cell groups, the UE may transmit one PUCCH for each cell group.

When the UE receives carrier aggregation-related configuration and PUCCH transmission-related configuration and can transmit PUCCH in the SCell, the UE may explicitly receive, from the base station, a PUCCH-allocated resource and carrier information for transmitting the resource according to a higher layer signal or an L1 signal. Alternatively, the UE receives carrier aggregation-related configuration and PUCCH transmission-related configuration and can transmit PUCCH in the SCell, the UE may transmit the PUCCH in a carrier capable of transmitting a valid PUCCH resource although not explicitly receiving from the base station the PUCCH-allocated resource and the carrier information for transmitting the resource according to the higher layer signal or the L1 signal. When the PUCCH resources scheduled by the higher layer signal or the L1 signal overlap within one cell or over several cells, the UE may select a specific PUCCH resource and a corresponding carrier and then transmit the PUCCH, or perform multiplexing and then select a PUCCH resource for transmitting the multiplexed control information and a carrier for transmitting the corresponding resource, based on at least one, some, or combination of a control information type, a subcarrier spacing between cells, PUCCH resource information, PUCCH format, or processing timeline required for multiplexing.

Figure 18:
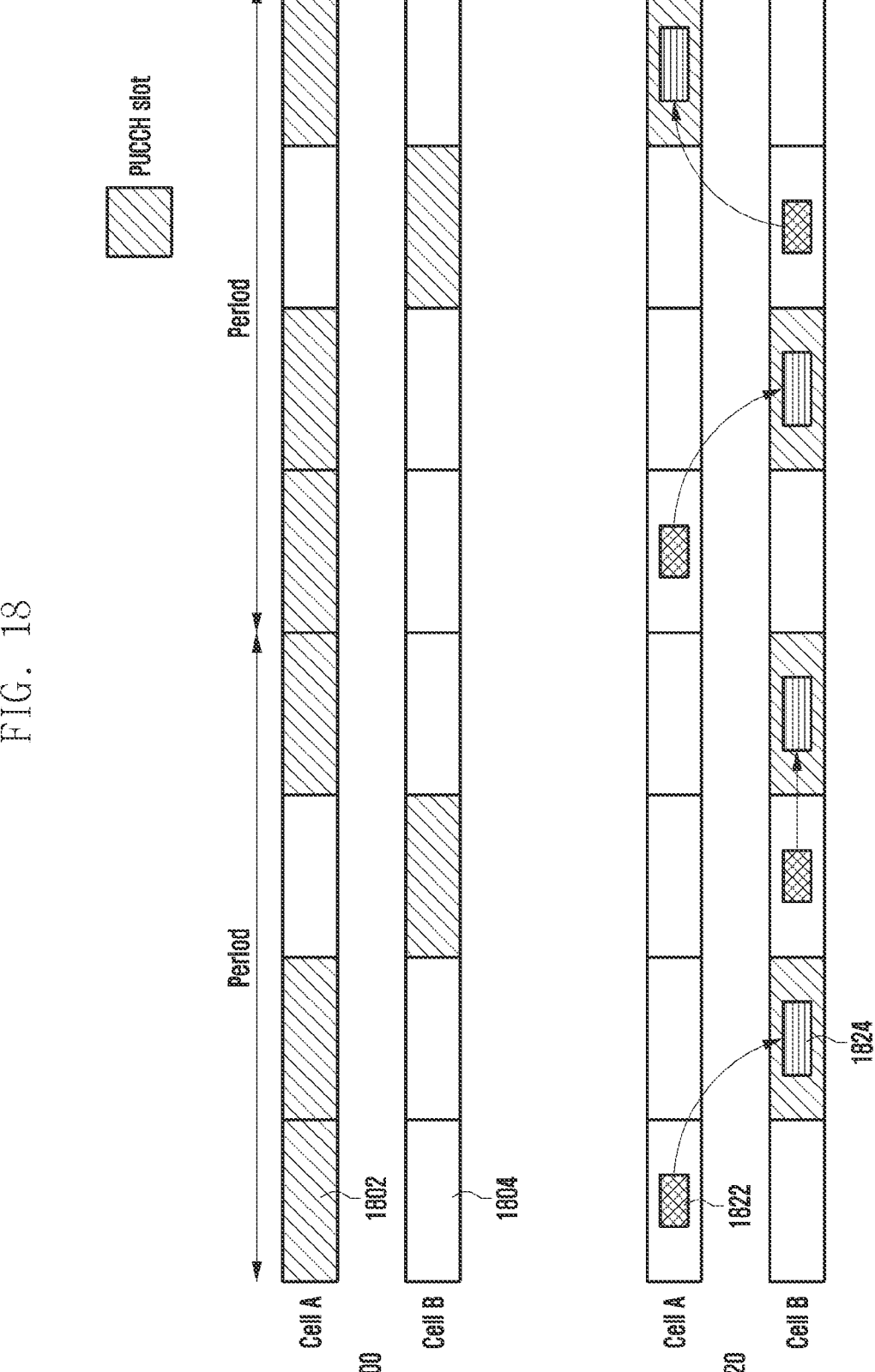
FIG. 18 illustrates a cell switching method for PUCCH transmission, according to an embodiment.

FIG. 18 is a diagram illustrating a cell switching method for PUCCH transmission, according to an embodiment.

FIG. 18 illustrates a method 1800 in which a cell for PUCCH transmission is implicitly indicated according to period and pattern information previously configured by the higher layer signal similar to that described in FIG. 6, and a method 1820 in which information for cell switching is included in the L1 signal and is dynamically indicated by explicitly selecting a cell in which a PUCCH including HARQ information is transmitted.

In the method 1800 of FIG. 18, a cell in which PUCCH transmission is selected within a previously configured period may be indicated by the higher layer signal. For example, if 0 corresponds to Cell A and 1 corresponds to Cell B, the example shown in FIG. 18 may be a case in which a cell in which PUCCH transmission is selected is configured by a bitmap "0010" through the higher layer signal. Slot 1802 is selected for PUCCH transmission, and slot 1804 is selected so that PUCCH transmission is not performed. Although it is assumed in FIG. 18 that the pattern is unvaried for each period, the pattern may be varied for each period, and in this case, a pattern value may be separately configured by the higher layer signal. When a separate pattern value is not configured, the UE may determine that the same pattern is applied for each period. In addition, the case where the UE is instructed to perform PUCCH transmission simultaneously on two or more cells within one PUCCH group at a specific slot or at a specific time is not considered. Here, the PUCCH group refers to a set of cells for PUCCH transmission in one cell, and up to two PUCCH groups may be configured for the UE. A description thereof is the same as that described above in FIG. 5.

In FIG. 18, the method 1820 is a method for indicating a cell in which HARQ information is to be transmitted/received according to a cell index value for PUCCH transmission in DCI. PDCCH 1822 includes DCI information, and PUCCH 1824 transmits HARQ information. In the case of DCI having no field indicating the cell index value, the PUCCH may be transmitted/received in the same cell as the cell in which the PDCCH including the corresponding DCI is transmitted/received, or the PUCCH may be always transmitted/received in the PCell regardless of the cell in which the PDCCH is transmitted/received. Alternatively, either one of the two methods may be always applied, or any one of the two methods may be configured by the higher layer signal and applied.

Also, each of the methods 1800 and 1820 may be configured by the higher layer signal, or both may be configured to be activated by the higher layer signal. In the case where DCI information does not have an indicator indicating cell switching, the method 1800 is applied. Otherwise, in the case where DCI information includes an indicator indicating cell switching, the method 1820 may be applied. For example, even if Cell A is configured as a cell for PUCCH transmission in the second PUCCH slot through the higher layer signal as in the method 1800, the UE may transmit PUCCH in Cell B according to DCI information in the case that Cell B is indicated as a cell for PUCCH transmission in the corresponding slot through DCI as in the method 1820. In the case of PUCCH transmitted and received periodically, such as scheduling request (SR) or period/semi-persistent (P/SP) CSI, the PUCCH may be transmitted in a cell selected according to DCI information, or in the case that a cell other than a cell originally selected by the higher layer signal is indicated through DCI, the UE may drop the PUCCH. Alternatively, whether the UE performs the above operation may be configured in advance by the higher layer signal, or supportability may vary depending on the UE capability.

Figure 19:
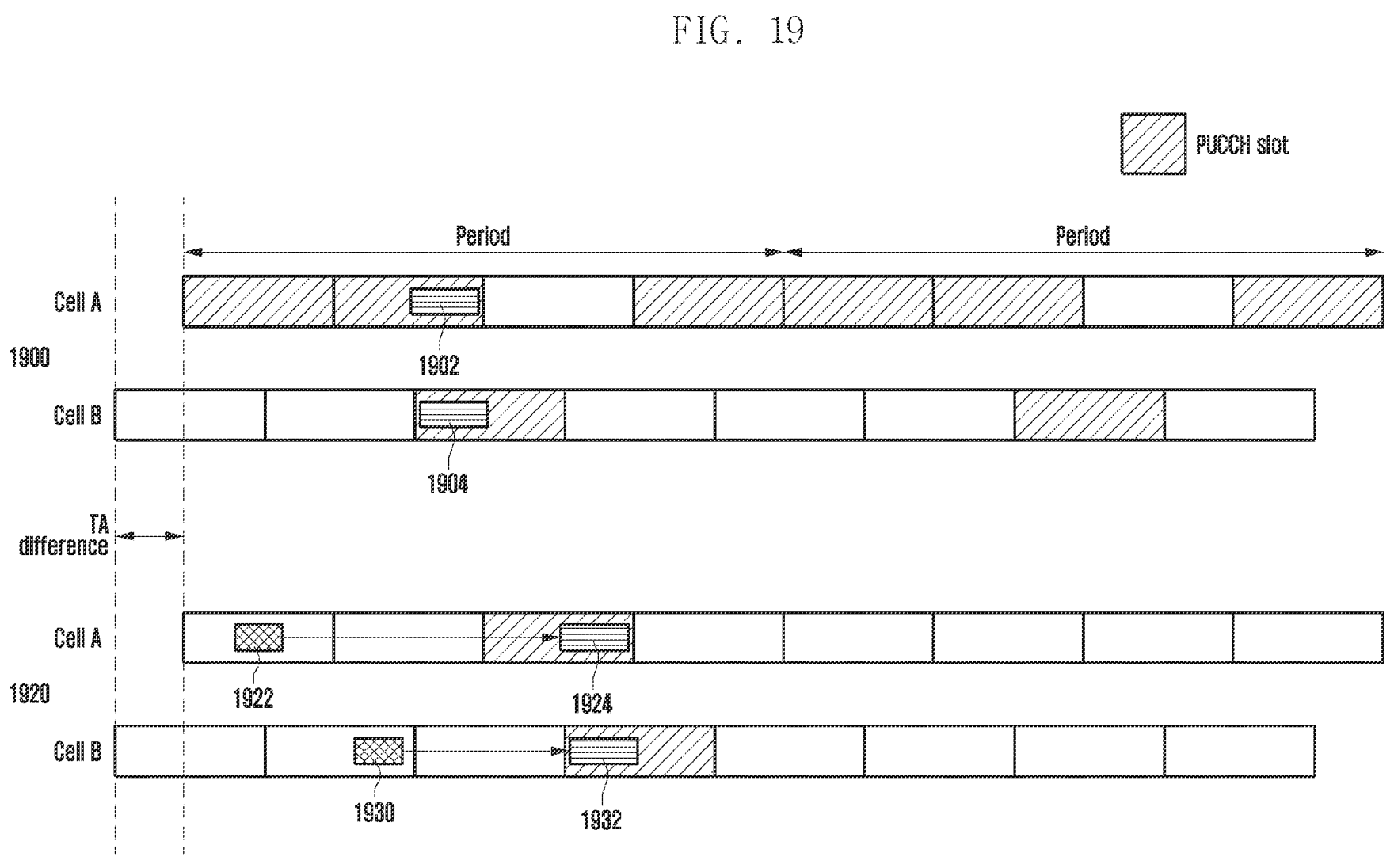

FIG. 19 is a diagram illustrating a case in which a TA value is different between cells capable of cell switching for PUCCH transmission, according to an embodiment.

In general, the base station and the UE are far apart from each other, and a delay time may always occur when a radio signal is transmitted by the base station and received by the UE, or vice versa, due to propagation delay time. Also, in general, the greater the distance between the base station and the UE, the greater the delay time value may occur. In addition, because for one base station the distances of UEs connected to the base station are different, it may be difficult for the base station to adjust the timing for each UE. Therefore, a method in which the base station fixes the physical channel timing and the UE adjusts the transmission timing to the reception timing of the base station is common, which is referred to as TA. Thus, the TA value of the UE that is relatively far from the base station is greater than the TA value of the UE that is relatively close to the base station. A high TA means that when the UE transmits control or data information in the uplink, the uplink control or data information is transmitted with respect to the transmission frame ahead of the reception frame by the corresponding TA value.

When the UE is connected to a plurality of cells and the distances of the base stations corresponding to the respective cells are different, the UE may be configured with a plurality of TAGs.

FIG. 19 illustrates a situation in which a plurality of PUCCHs are transmitted at a specific time due to different TA values of the UE in a case where the TA value of Cell B is greater than that of Cell A. Specifically, FIG. 19 does not consider a case in which PUCCH resources are allocated or scheduled in two or more cells at a specific time point or a specific slot as in FIG. 18 from the viewpoint of a logical channel or a logical frame. However, when the TA values of the cells are different, a case 1900 in which some symbols overlap between PUCCH slots configured by the higher layer signal may occur from the viewpoint of the physical channel or the physical frame, and as shown in FIG. 19, symbols of PUCCH 1902 and PUCCH 1904 may overlap in view of the physical channel.

For example, when the PUCCH 1902 is SR or P-CSI configured by the higher layer signal in advance and the PUCCH 1904 is HARQ-ACK information, and when the TA values of Cell A and Cell B are the same, the UE may transmit the PUCCH 1902 in Cell A and then transmit the PUCCH 1904 in Cell B. However, when the TA values of the cells are different from each other, a case where the UE simultaneously transmits the PUCCH 1902 in Cell A and the PUCCH 1904 in Cell B at a specific time point may occur. From the viewpoint of UE implementation, this is the same as having the capability of transmitting PUCCH in a plurality of cells in one cell group, so it is necessary to solve this.

Similarly, in a case of a method 1920 for designating a cell index by DCI, if the TA values configured in Cell A and Cell B are different, a case where the UE simultaneously transmits HARQ-ACK PUCCH 1924 scheduled in PDCCH 1922 including DCI in Cell A and HARQ-ACK PUCCH 1932 scheduled in PDCCH 1930 including another DCI in Cell B at a specific point in time may occur. Therefore, in order to avoid this situation, at least one or a combination of two or more of the following methods may be applied.

Method 19-1: Configuring the same TA value. In this method, the base station always indicates the same TA value, or belonging to the same TA group, for cells capable of cell switching for PUCCH transmission. Therefore, the UE may be indicated with the same TA value for the cells capable of switching the PUCCH transmission.

Method 19-2: Determining the TA values to be the same. Unlike the method 19-1, a case in which the base station indicates different TA values for cells capable of cell switching for PUCCH transmission is considered. In this case, the UE may match the TA value to a specific cell among a plurality of cells. For example, when the TA value, TA1, of Cell A and the TA value, TA2, of Cell B are different for cells capable of PUCCH transmission, the UE may commonly apply TA1 or TA2 between TA1 and TA2. Alternatively, it may be assumed as the TA value of the PCell. Because the TA value is an accumulated value rather than an absolute value applied to the base station, the UE may have different TA accumulation values when the TAs of Cell A and Cell B belong to different TAGs. Specifically, this may correspond to a case in which the UE does not receive a message indicating TA adjustment. In consideration of such a situation, the UE may always apply the TA applied to a specific cell to other cells. This may be applied by limiting the cells to be switched for PUCCH transmission.

Method 19-3: Adding a gap symbol constraint between consecutive PUCCH transmissions. The method 19-3 is a method for a specific gap in time to be satisfied between corresponding PUCCH transmission intervals when PUCCH transmission continuously occurs between cells capable of cell switching for PUCCH transmission. Specifically, in the case that the first PUCCH is transmitted/received in Cell A and the second PUCCH is transmitted/received in Cell B, the UE transmits the first PUCCH and the second PUCCH when an interval between the last symbol of the first PUCCH and the first symbol of the second PUCCH is at least greater than or equal to X symbols. The X symbol may have a natural number or a positive integer value, and may have different values depending on the subcarrier spacing. In addition, different values may be applied to the UEs according to the UE capability report. Alternatively, the X value may be determined to be a different value according to a difference between the TA values of Cell A and Cell B. If the interval between the last symbol of the first PUCCH and the first symbol of the second PUCCH is less than X symbols, the UE may drop one of the two PUCCHs, and whether a PUCCH is dropped or transmitted may be determined based on priority information of the PUCCH or a transmission start time point at which the PUCCH is scheduled. For example, if the priority of the first PUCCH is higher than that of the second PUCCH, the UE may drop the second PUCCH and transmit only the first PUCCH. In another example, if the first PUCCH starts earlier than the second PUCCH in terms of time resources, the UE may drop the second PUCCH and transmit only the first PUCCH. Meanwhile, the above-described method may not be applied to the case that the first PUCCH and the second PUCCH are transmitted in the same cell.

Method 19-4: Allocating an invalid symbol for PUCCH transmission. In the method 19-4, when TA values are different between cells capable of PUCCH cell switching, the number of specific symbols in the second half in the slot immediately before PUCCH cell switching may be configured as the number of symbols invalid for PUCCH transmission, or the number of specific symbols in the first half in the slot immediately after PUCCH cell switching may be configured as the number of symbols invalid for PUCCH transmission. For example, when the cell switching occurs for PUCCH transmission from the first slot of Cell A to the second slot of Cell B, the UE may consider that the last Y symbols in the first slot are invalid symbols for PUCCH transmission, or consider that the first Y symbols in the second slot are invalid symbols for PUCCH transmission. When PUCCH is scheduled by DCI or configured by higher layer signaling in the invalid symbols, the UE may drop the corresponding PUCCH transmission/reception, The Y value may have a natural number or a positive integer value, may be different for each subcarrier spacing, may be configured by higher layer signaling, or may be determined by UE capability. Alternatively, the Y value may be determined to be a different value according to a difference between the TA values of Cell A and Cell B. In addition, in order to determine the last Y symbols in the first slot as invalid symbols or the first Y symbols in the second slot as invalid symbols, the UE may select one of the two methods in terms of UE implements, or one of the two methods may be defined in the standard or configured by higher layer signaling.

Method 19-5: When PUCCH transmission of Cell A and PUCCH transmission of Cell B overlap with each other due to a TA difference, the UE drops one PUCCH and transmits the other PUCCH. The method 19-5 does not match the TA value or use the gap symbol, unlike the methods 19-1 to 19-4. In the method 19-5, when at least one symbol overlaps between the first PUCCH transmission of Cell A and the second PUCCH transmission of Cell B from the viewpoint of a physical channel due to different TA values from the viewpoint of UE operation, the UE may drop one of the two PUCCH transmissions. In this case, the PUCCH to be dropped may be determined by UE implementation. Alternatively, the UE may drop the PUCCH transmission having a lower priority between the first PUCCH and the second PUCCH. Alternatively, the UE may drop the PUCCH transmission that starts the latest from the viewpoint of time resources between the first PUCCH and the second PUCCH. Alternatively, the UE may drop the first PUCCH transmission from the viewpoint of time resources between the first PUCCH and the second PUCCH. Alternatively, the UE may drop both the first PUCCH and the second PUCCH.

Although in FIG. 19 the case that two PUCCHs overlap is described as an example for convenience, the scope of the disclosure is not limited thereto. This may also be applied to the case that one PUCCH and PUSCH including UCI information overlap due to different TAs.

FIG. 20 is a flowchart illustrating an operation of a UE supporting PUCCH transmission based on cell switching, according to an embodiment.

At step 2000, the UE may receive cell switching-related higher layer signal information for PUCCH transmission. The higher layer signal information may be information for configuring to operate according to the method 1800 in FIG. 18, information for configuring to operate according to the method 1820, or information including both information. In the case that higher layer signal information configures to operate according to the method 1800, the higher layer signal information may include a period for cell switching-based PUCCH transmission and bitmap information indicating which cell is selected for PUCCH transmission in a specific slot within the period. In the case that higher layer signal information configures to operate according to the method 1820, the higher layer signal information may include information indicating whether cell selection indicator information for PUCCH transmission is included in DCI format. The UE may receive TA information from the base station for each cell or cell group in a situation in which it is configured to operate with a plurality of cells. The TA information may be delivered to the UE through MAC CE or other higher layer signals. In the case of delivery through the MAC CE, when a slot in which HARQ-ACK information for PDSCH including MAC CE information is transmitted is n, the UE may determine that information stored in the MAC CE is applied from slot n+3. In n+3, 3 is merely exemplary, and other values may be applied.

At step 2002, based on receiving the PUCCH transmission cell switching-related higher signal information and the TA-related information, the UE may determine whether PUCCH resources scheduled by the base station overlap for two or more cells at the same time at a specific time point from the viewpoint of a physical channel. In case of overlap, the UE may transmit all overlapping PUCCHs, may drop one and transmit only the other, or may drop both This may follow the method 19-1 or method 19-5 described in FIG. 19. Alternatively, the UE may operate such that PUCCHs do not overlap at a specific time in a plurality of cells in terms of a physical channel or a physical frame by using at least one of the methods 19-2 to 19-4. The description of FIG. 20 may be limitedly applied within one cell group in which an operation is defined to support only one PUCCH transmission per cell group.

Figure 21:
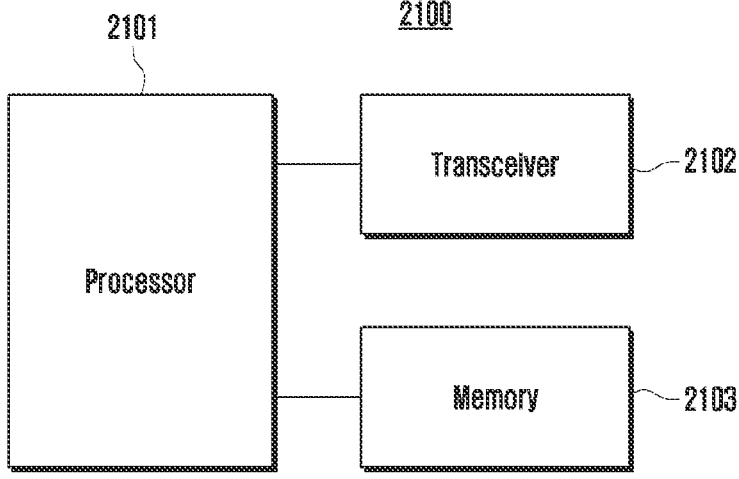
FIG. 21 schematically illustrates a UE, according to an embodiment.

FIG. 21 is a diagram schematically illustrating a structure of a UE, according to an embodiment.

With reference to FIG. 21, the UE may include a processor 2101, a transceiver 2102, and a memory 2103. Herein, the processor may be defined as a circuit, an application-specific integrated circuit, or at least one processor.

The processor 2101 may control the overall operation of the UE. For example, the processor 2101 may control a signal flow between blocks to perform the operations described above in the flowchart. Also, the processor 2101 may write data to and read data from the memory 2103. In addition, the processor 2101 may perform functions of a protocol stack required by a communication standard. To this end, the processor 2101 may include at least one processor or microprocessor, or the processor 2101 may be a part of the processor. Also, a part of the transceiver 2102 and the processor 2101 may be referred to as a communication processor (CP).

The transceiver 2102 may perform functions for transmitting and receiving signals through a wireless channel. For example, the transceiver 2102 may perform a conversion function between a baseband signal and a bit stream in accordance with a physical layer standard of a system. For example, upon data transmission, the transceiver 2102 may generate complex symbols by encoding and modulating a bit stream to be transmitted. Also, upon data reception, the transceiver 2102 may restore a received bit stream by demodulating and decoding a baseband signal. In addition, the transceiver 2102 may up-convert a baseband signal into an RF band signal and then transmit it through an antenna, and down-convert an RF band signal received through an antenna into a baseband signal. For example, the transceiver 2102 may include a transmit filter, a receive filter, an amplifier, a mixer, an oscillator, a digital-to-analog converter (DAC), an analog-to-digital converter (ADC), etc. Also, the transceiver 2102 may include a plurality of transmission/reception paths. Furthermore, the transceiver 2102 may include at least one antenna array composed of a plurality of antenna elements. In terms of hardware, the transceiver 2102 may be composed of a digital circuit and an analog circuit (e.g., a radio frequency integrated circuit (RFIC)). Here, the digital circuit and the analog circuit may be implemented as one package. In addition, the transceiver 2102 may include a plurality of RF chains.

The memory 2103 may store data such as a default program, an application program, and configuration information for the operation of the UE. The memory 2103 may be composed of a volatile memory, a non-volatile memory, or a combination thereof. In addition, the memory 2103 may provide stored data at the request of the processor 2101. The memory 2103 may store at least one of information transmitted/received through the transceiver 2102 and information generated through the processor 2101.

Figure 22:
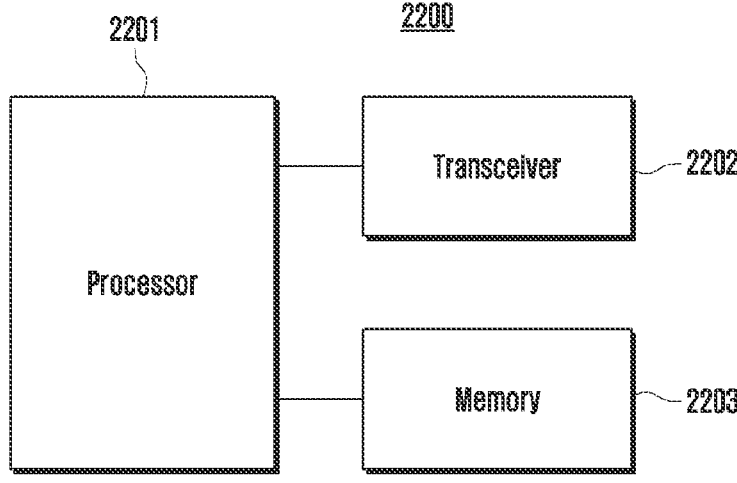
FIG. 22 schematically illustrates a base station according to an embodiment.

FIG. 22 is a diagram schematically illustrating a structure of a base station, according to an embodiment.

With reference to FIG. 22, the base station may include a processor 2201, a transceiver 2202, and a memory 2203.

Herein, the processor may be defined as a circuit, an application-specific integrated circuit, or at least one processor.

The processor 2201 may control the overall operation of the base station. For example, the processor 2201 may control a signal flow between blocks to perform the operations described above in the flowchart. Also, the processor 2201 may write data to and read data from the memory 2203. In addition, the processor 2201 may perform functions of a protocol stack required by a communication standard. To this end, the processor 2201 may include at least one processor or microprocessor, or the processor 2201 may be a part of the processor. Also, a part of the transceiver 2202 and the processor 2201 may be referred to as a CP.

The transceiver 2202 may perform functions for transmitting and receiving signals through a wireless channel. For example, the transceiver 2202 may perform a conversion function between a baseband signal and a bit stream in accordance with a physical layer standard of a system. For example, upon data transmission, the transceiver 2202 may generate complex symbols by encoding and modulating a bit stream to be transmitted. Also, upon data reception, the transceiver 2202 may restore a received bit stream by demodulating and decoding a baseband signal. In addition, the transceiver 2202 may up-convert a baseband signal into an RF band signal and then transmit it through an antenna, and down-convert an RF band signal received through an antenna into a baseband signal. For example, the transceiver 2202 may include a transmit filter, a receive filter, an amplifier, a mixer, an oscillator, a DAC, an ADC, etc. Also, the transceiver 2202 may include a plurality of transmission/reception paths. Furthermore, the transceiver 2202 may include at least one antenna array composed of a plurality of antenna elements. In terms of hardware, the transceiver 2202 may be composed of a digital circuit and an analog circuit (e.g., an RFIC). Here, the digital circuit and the analog circuit may be implemented as one package. In addition, the transceiver 2202 may include a plurality of RF chains.

The memory 2203 may store data such as a default program, an application program, and configuration information for the operation of the base station. The memory 2203 may be composed of a volatile memory, a non-volatile memory, or a combination thereof. In addition, the memory 2203 may provide stored data at the request of the processor 2201. The memory 2203 may store at least one of information transmitted/received through the transceiver 2202 and information generated through the processor 2201.

Herein, the higher signal may be at least one of RRC, MAC CE, system access information, or information exchanged at an application level.

Herein, the L1 signal may be at least one of the followings, which may be commonly applied to the L1 signal described above in the disclosure.

Specific bit field value in DCI: A bit field constituting DCI and may correspond to the existing DCI field (e.g., HARQ process number, MCS information, Carrier indicator, BWP indicator, RV indicator, NDI information, time allocation information, frequency allocation information, PUCCH resource information, power allocation information, etc.) or a new DCI field (e.g., PUCCH carrier index information for HARQ-ACK information transmission).

DCI format information: One or a plurality of DCI formats may be monitored by the UE. PUCCH carrier index information for transmitting HARQ-ACK information associated with each DCI format may be configured in advance. For example, DCI format a may be cell index 1, DCI format b may be cell index 2, and the like.

RNTI value scrambled to CRC of DCI: The scrambled RNTI of CRC of DCI may vary, and PUCCH carrier index information for transmission of HARQ-ACK information associated with the scrambled RNTI like DCI format may be configured in advance. For example, RNTI A may be cell index 1, RNTI b may be cell index 2, and the like.

PDCCH configuration information (CORESET, search space, etc.) through which DCI is transmitted/received may correspond. The PDCCH transmission resource (CORESET, search space, cell index, BWP, time or frequency resource) through which DCI can be transmitted and received may also vary, and PUCCH carrier index information for transmission of HARQ-ACK information associated with the scrambled RNTI like DCI format may be configured in advance. For example, PDCCH a may be cell index 1, PDCCH b may be cell index 2, and the like.

The methods according to claims or embodiments described herein may be implemented by hardware, software, or a combination of hardware and software.

In case of implementation using software, a computer-readable storage medium for storing one or more programs (software modules) may be provided as hardware. One or more programs stored in the computer-readable storage medium are configured for execution by one or more processors in an electronic device. The one or more programs include instructions that cause the electronic device to perform the methods according to claims or embodiments described herein.

Such programs (software module, software) may be stored in a random access memory (RAM), a non-volatile memory including a flash memory, a read only memory (ROM), an electrically erasable programmable ROM (EEPROM), a magnetic disc storage device, a compact disc ROM, digital versatile discs (DVDs) or other optical storage devices, and a magnetic cassette. Alternatively, the programs may be stored in a memory combining part or all of the above recording media. A plurality of memories may be equipped.

In addition, the programs may be stored in an attachable storage device accessible via a communication network formed of Internet, Intranet, local area network (LAN), wide area network (WAN), or storage area network (SAN) alone or in combination. This storage device may access an apparatus performing embodiments through an external port. In addition, a separate storage device in the communication network may access an apparatus performing embodiments.

In the above-described embodiments, components or elements have been expressed as a singular or plural form. It should be understood, however, that such singular or plural representations are selected appropriately according to situations presented for the convenience of description, and the disclosure is not limited to the singular or plural form. Even expressed in a singular form, a component or element may be construed as a plurality of components or elements, and vice versa.

Embodiments of the disclosure and the accompanying drawings are only examples presented in order to easily describe the disclosure and facilitate comprehension of the disclosure, but are not intended to limit the scope of the disclosure. Therefore, the scope of the disclosure should be construed as including all changes or modifications derived from the technical contents of the disclosure in addition to the embodiments disclosed herein.

What is claimed is:

1. A method performed by a terminal in a wireless communication system, the method comprising:

transmitting, to a base station, capability information of the terminal;

receiving, from the base station, configuration information related to physical uplink control channel (PUCCH) cell switching according to the capability information;

identifying whether a time difference between a last symbol of a first PUCCH and a first symbol of a second PUCCH for the PUCCH cell switching is greater than or equal to a threshold for preventing simultaneous transmission of the first PUCCH and the second PUCCH;

in case that the time difference is greater than or equal to the threshold, transmitting, to the base station, the first PUCCH on a first cell and the second PUCCH on a second cell for the PUCCH cell switching, based on the configuration information; and in case that the time difference is less than the threshold, dropping one of the first PUCCH or the second PUCCH, based on at least one of priority information or information on a transmission time at which the first PUCCH and the second PUCCH are scheduled.

2. The method of claim 1, wherein the configuration information includes information on a periodic pattern for the PUCCH cell switching.

3. The method of claim 2, wherein each bit of the information on the periodic pattern for the PUCCH cell switching corresponds to a slot with value of 0 or value of 1 respectively indicating the first cell or the second cell for the PUCCH cell switching.

4. The method of claim 1, wherein the configuration information includes information indicating that the PUCCH cell switching is based on a dynamic indication in downlink control information (DCI).

5. The method of claim 4, wherein transmitting the second PUCCH comprises:

receiving, from the base station, the DCI indicating the second cell for the PUCCH cell switching; and transmitting, to the base station, the second PUCCH on the second cell for the PUCCH cell switching indicated by the DCI.

6. A method performed by a base station in a wireless communication system, the method comprising:

receiving, from a terminal, capability information of the terminal;

transmitting, to the terminal, configuration information related to physical uplink control channel (PUCCH) cell switching based on the capability information; and in case that a time difference between a last symbol of a first PUCCH and a first symbol of a second PUCCH for the PUCCH cell switching is greater than or equal to a threshold, receiving, from the terminal, the first PUCCH on a first cell and the second PUCCH on a second cell for the PUCCH cell switching, according to the configuration information, wherein, in case that the time difference is less than the threshold, one of the first PUCCH or the second PUCCH is dropped based on at least one of priority information or information on a transmission time at which the first PUCCH and the second PUCCH are scheduled.

7. The method of claim 6, wherein the configuration information includes information on a periodic pattern for the PUCCH cell switching.

8. The method of claim 7, wherein each bit of the information on the periodic pattern for the PUCCH cell switching corresponds to a slot with value of 0 or value of 1 respectively indicating the first cell or the second cell for the PUCCH cell switching.

9. The method of claim 6, wherein the configuration information includes information indicating that the PUCCH cell switching is based on a dynamic indication in downlink control information (DCI).

10. The method of claim 9, wherein receiving the second PUCCH comprises:

transmitting, to the terminal, the DCI indicating the second cell for the PUCCH cell switching; and receiving, from the terminal, the second PUCCH on the second sell for the PUCCH cell switching indicated by the DCI.

11. A terminal in a wireless communication system, the terminal comprising:

a transceiver; and a controller configured to:

transmit, to a base station via the transceiver, capability information of the terminal, receive, from the base station via the transceiver, configuration information related to physical uplink control channel (PUCCH) cell switching according to the capability information, identify whether a time difference between a last symbol of a first PUCCH and a first symbol of a second PUCCH for the PUCCH cell switching is greater than or equal to a threshold for preventing simultaneous transmission of the first PUCCH and the second PUCCH, in case that the time difference is greater than or equal to the threshold, transmit, to the base station via the transceiver, the first PUCCH on a first cell and the second PUCCH on a second cell for the PUCCH cell switching, based on the configuration information, and in case that the time difference is less than the threshold, drop one of the first PUCCH or the second PUCCH, based on at least one of priority information or information on a transmission time at which the first PUCCH and the second PUCCH are scheduled.

12. The terminal of claim 11, wherein the configuration information includes information on a periodic pattern for the PUCCH cell switching.

13. The terminal of claim 12, wherein each bit of the information on the periodic pattern for the PUCCH cell switching corresponds to a slot with value of 0 or value of 1 respectively indicating the first cell or the second cell for the PUCCH cell switching.

14. The terminal of claim 11, wherein the configuration information includes information indicating that the PUCCH cell switching is based on a dynamic indication in downlink control information (DCI).

15. The terminal of claim 14, wherein, in transmitting the second PUCCH, the controller is further configured to:

receive, from the base station via the transceiver, the DCI indicating the second cell for the PUCCH cell switching, and transmit, to the base station via the transceiver, the second PUCCH on the second cell for the PUCCH cell switching indicated by the DCI.

16. A base station in a wireless communication system, the base station comprising:

a transceiver; and a controller configured to:

receive, from a terminal via the transceiver, capability information of the terminal, transmit, to the terminal via the transceiver, configuration information related to physical uplink control channel (PUCCH) cell switching based on the capability information, and in case that a time difference between a last symbol of a first PUCCH and a first symbol of a second PUCCH for the PUCCH cell switching is greater than or equal to a threshold, receive, from the terminal via the transceiver, the first PUCCH on a first cell and the second PUCCH on a second cell for the PUCCH cell switching, according to the configuration information, wherein, in case that the time difference is less than the threshold, one of the first PUCCH or the second PUCCH is dropped based on at least one of priority information or information on a transmission time at which the first PUCCH and the second PUCCH are scheduled.

17. The base station of claim 16, wherein the configuration information includes information on a periodic pattern for the PUCCH cell switching.

18. The base station of claim 17, wherein each bit of the information on the periodic pattern for the PUCCH cell switching corresponds to a slot with value of 0 or value of 1 respectively indicating the first cell or the second cell for the PUCCH cell switching.

19. The base station of claim 16, wherein the configuration information includes information indicating that the PUCCH cell switching is based on a dynamic indication in downlink control information (DCI).

20. The base station of claim 19, wherein, in receiving the second PUCCH, the controller is further configured to:

transmit, to the terminal via the transceiver, the DCI indicating the second cell for the PUCCH cell switching, and receive, from the terminal via the transceiver, the PUCCH on the second cell for the PUCCH cell switching indicated by the DCI.

* * * * *